(12) United States Patent
Shimokawabe

(10) Patent No.: US 12,205,474 B2
(45) Date of Patent: Jan. 21, 2025

(54) SHIP MOVEMENT-SHARING NAVIGATION ASSISTANCE SYSTEM

(71) Applicant: AIDEA INC., Tokyo (JP)

(72) Inventor: Tomohiro Shimokawabe, Tokyo (JP)

(73) Assignee: AIDEA INC., Tokyo (JP)

( * ) Notice: Subject to any disclaimer, the term of this patent is extended or adjusted under 35 U.S.C. 154(b) by 522 days.

(21) Appl. No.: 17/355,640

(22) Filed: Jun. 23, 2021

(65) Prior Publication Data

US 2021/0350710 A1 Nov. 11, 2021

Related U.S. Application Data

(63) Continuation of application No. PCT/JP2019/042808, filed on Oct. 31, 2019.

(30) Foreign Application Priority Data

Dec. 25, 2018 (JP) .................................. 2018-240894

(51) Int. Cl.
*G08G 3/02* (2006.01)
*B63B 49/00* (2006.01)
*G01C 21/20* (2006.01)

(52) U.S. Cl.
CPC ................ *G08G 3/02* (2013.01); *B63B 49/00* (2013.01); *G01C 21/203* (2013.01); *B63B 2213/02* (2013.01)

(58) Field of Classification Search
CPC ...... G08G 3/02; B63B 49/00; B63B 2213/02; G01C 21/203; G06F 9/451;
(Continued)

(56) References Cited

U.S. PATENT DOCUMENTS 7,805,146 B1 9/2010 Beyer, Jr.
8,296,001 B1 * 10/2012 Kabel .................... G08G 3/02
701/410
(Continued)

FOREIGN PATENT DOCUMENTS

AT 537529 T 12/2011
CN 106772262 A 5/2017
(Continued)

OTHER PUBLICATIONS

Machine Translated JP2017076411 (Year: 2017).*
(Continued)

*Primary Examiner* — Anne Marie Antonucci
*Assistant Examiner* — Misa H Nguyen
(74) *Attorney, Agent, or Firm* — ROSSI, KIMMS & McDOWELL LLP

(57) ABSTRACT

A Ship Movement-Sharing Navigation Support System is provided based on IoT or AI by using inexpensive and easy-to-carry user terminals such as smartphones or tablets. A method for navigating a ship comprises receiving a position information transmitted from a user terminal used in a user terminal-equipped ship via a mobile telephone network; receiving a position information via an AIS system transmitted via a VHF radio from an AIS device-equipped ship; and displaying icons of the user terminal-equipped ship and the AIS device-equipped ship on a nautical chart or radar display of the user terminal. In addition, the method comprises calculating a predicted moving route of the user terminal-equipped ship and the AIS device-equipped ship based on the information received from the user terminal and the AIS device and preventing a collision by displaying a caution or warning alert in a case there is a possibility of collision.

18 Claims, 34 Drawing Sheets

(58) Field of Classification Search
CPC ............ G06F 3/04812; G06F 3/04817; G06F 3/0482; G06F 3/04847; G06F 3/04855; G06F 3/0488; G06F 3/04842; G06F 3/0481

See application file for complete search history.

(56) References Cited

U.S. PATENT DOCUMENTS

| | | | | |
|---|---|---|---|---|
| 2008/0133131 | A1* | 6/2008 | Poreda | G08G 3/02 701/418 |
| 2009/0271054 | A1 | 10/2009 | Dokken | |
| 2011/0144912 | A1* | 6/2011 | Lee | G08G 3/00 340/985 |
| 2011/0210865 | A1* | 9/2011 | Lee | G08G 3/02 340/903 |
| 2012/0130571 | A1* | 5/2012 | Dunkle | G05D 1/0206 701/21 |
| 2017/0052029 | A1* | 2/2017 | Ninomiya | G01C 21/203 |
| 2017/0287340 | A1 | 10/2017 | Suzuki | |
| 2018/0043976 | A1 | 2/2018 | Nakamoto | |

FOREIGN PATENT DOCUMENTS

| | | | | |
|---|---|---|---|---|
| CN | 106971628 | A | 7/2017 | |
| EP | 2070068 | A2 | 6/2009 | |
| GB | 2441802 | A | 3/2008 | |
| JP | H07129872 | A | 5/1995 | |
| JP | 2001211111 | A | 8/2001 | |
| JP | 2002157309 | A | 5/2002 | |
| JP | 2006163765 | A | 6/2006 | |
| JP | 2008009846 | A | 1/2008 | |
| JP | 2010503908 | A | 2/2010 | |
| JP | 2016177382 | A | 10/2016 | |
| JP | 2017076411 | A | 4/2017 | |
| JP | 2017078610 | A | 4/2017 | |
| JP | 2017182730 | A | 10/2017 | |
| JP | 6379430 | B2 | 8/2018 | |
| KR | 101104964 | B1 * | 1/2012 | G08G 3/02 |
| KR | 1020180076187 | A | 7/2018 | |
| WO | 2008031880 | A2 | 3/2008 | |
| WO | 2016147463 | A1 | 9/2016 | |

OTHER PUBLICATIONS

Xiaojie Sun et al. "Collision Avoidance of Podded Propulsion Unmanned Surface Vehicle With COLREGs Compliance and Its Modeling and Identification", 2018. (Year: 2018).*

Machine Translated KR101104964 (Year: 2012).*

Extended European Search Report issued in European Patent Application No. 19905444.6 mailed Sep. 16, 2022.

Desvignes. "The Share-Loc Project: a WAP-based maritime location system." Proceedings of the Third International Conference on Web Information Systems Engineering (Workshops) 2002. pp. 88-94.

Eriksen. "Radar-based Maritime Collision Avoidance using Dynamic Window.", 2018 IEEE Aerospace Conference, IEEE. Mar. 3, 2018: pp. 1-9.

Office Action issued in Chinese Appln. No. 201980085716.7 mailed on Jun. 30, 2022. English translation provided.

International Search Report issued in Intl. Appln. No. PCT/JP2019/042808 mailed Dec. 24, 2019. English translation provided.

Written Opinion issued in Intl. Appln. No. PCT/JP2019/042808 mailed Dec. 24, 2019. English translation provided.

* cited by examiner

[FIG. 1]
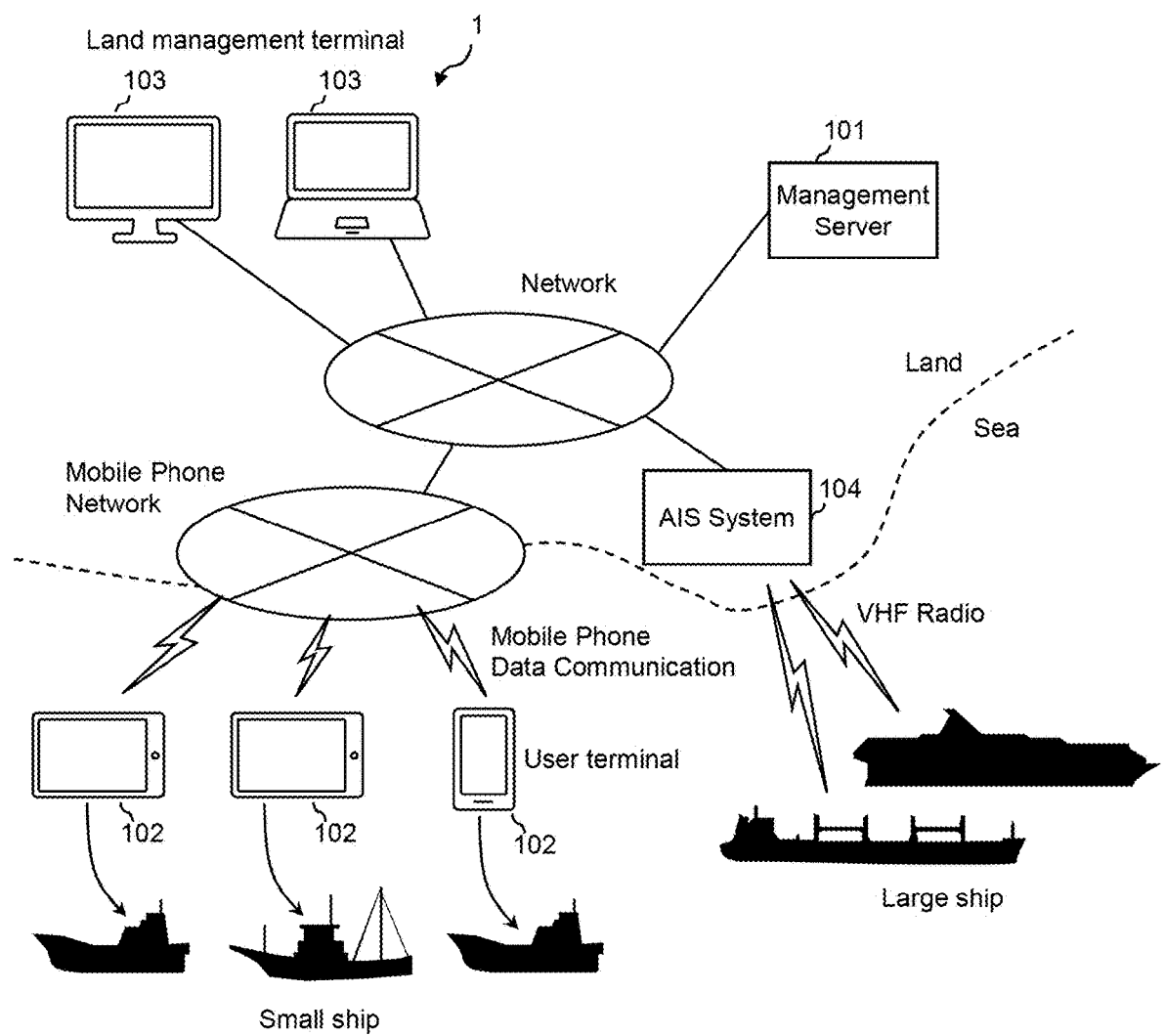

[FIG. 2]
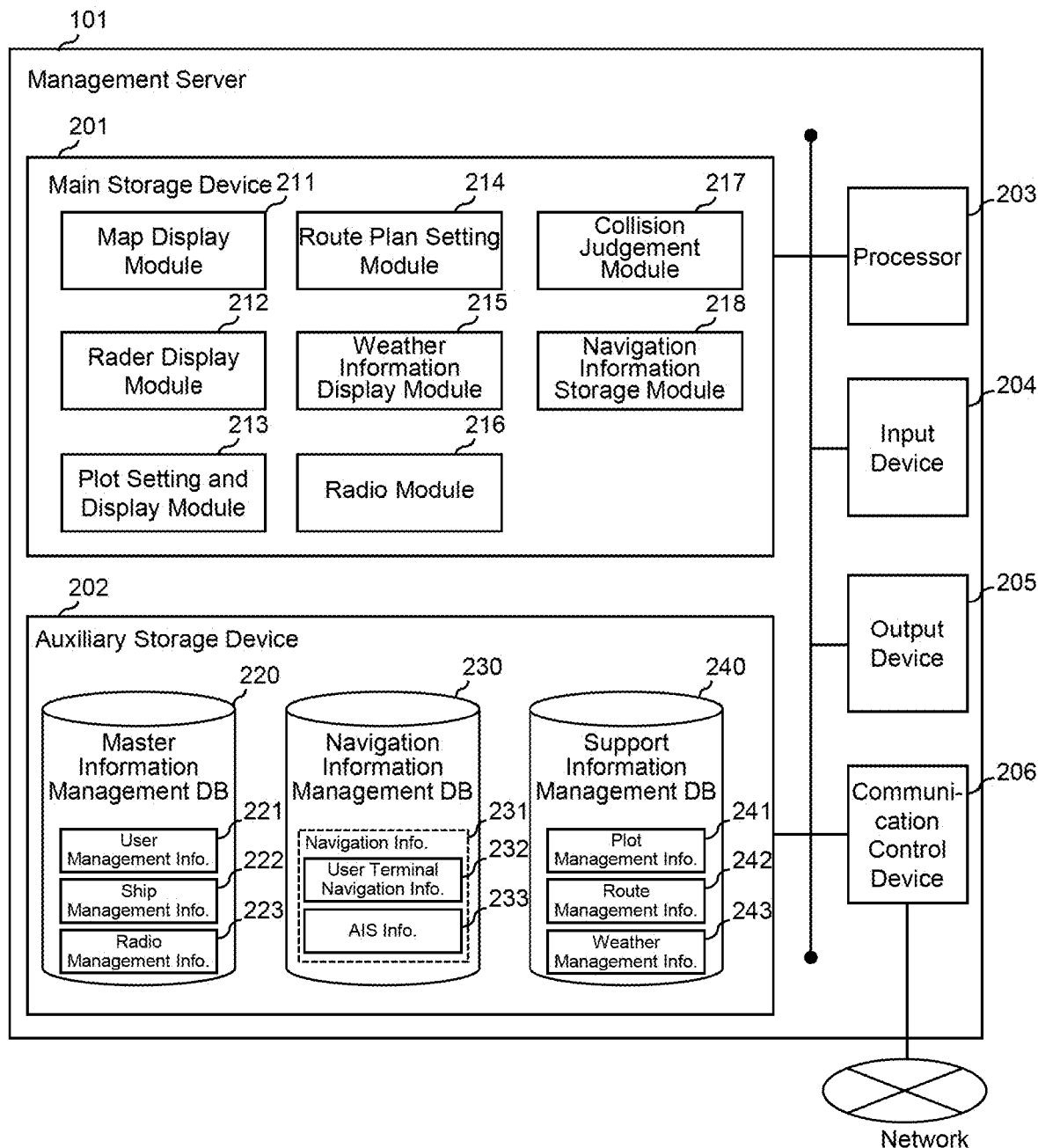

[FIG. 3]
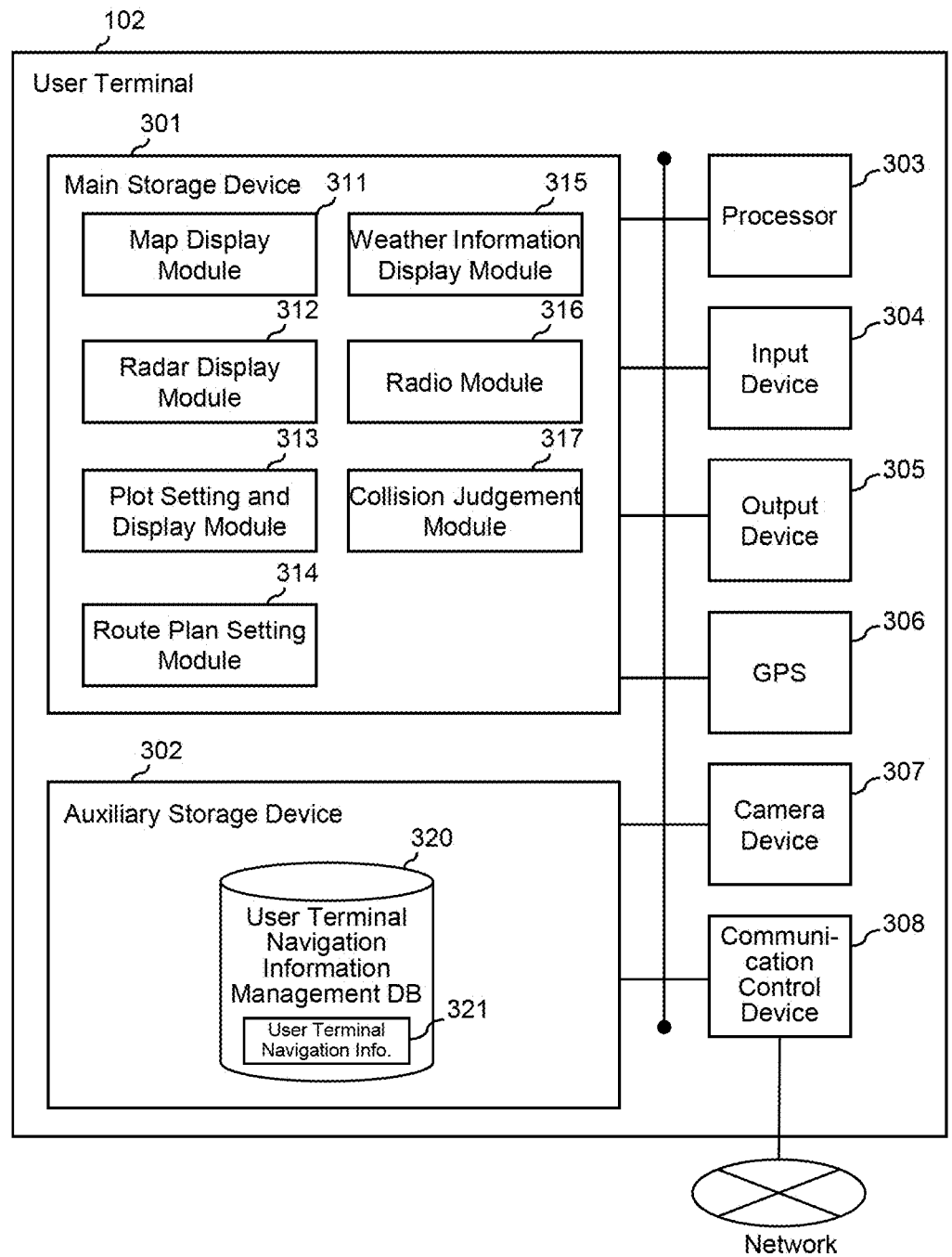

[FIG. 4]
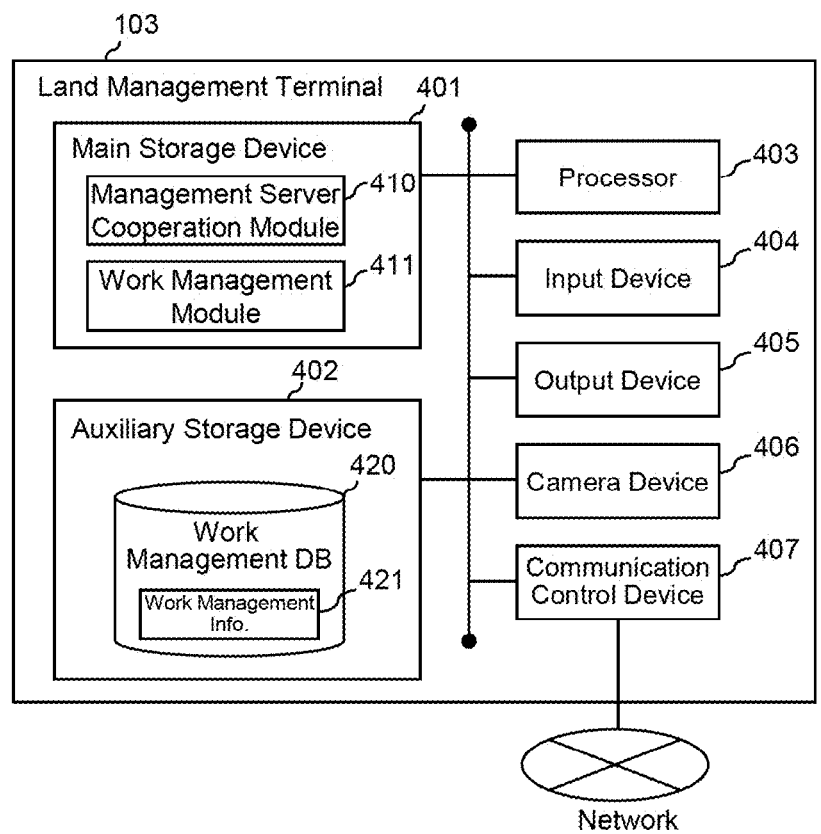

[FIG. 5]

221 User Management Information

| User Profile ID (501) | Photo ID (502) | Name (Japanese) (503) | Name (English) (504) | Phone Number (505) | E-mail Address (506) | E-mail Arrival Confirmation (507) | Created Date and Time (508) | Updated Date and Time (509) |
|---|---|---|---|---|---|---|---|---|
| 1 | 1 | 松村 太郎 | Matsumura Taro | 090-xxxx-xxxx | matsumura@example.com | 1 | 2018-10-01 00:00:00 | 2018-10-01 00:00:00 |
| 2 | 2 | 波多野 花 | Hatano Hana | 080-xxxx-xxxx | hatano@example.com | 1 | 2018-10-01 00:00:00 | 2018-10-01 00:00:00 |
| 3 | 3 | 田辺 次郎 | Tanabe Jiro | 090-xxxx-xxxx | tanabe@example.com | 1 | 2018-10-01 00:00:00 | 2018-10-01 00:00:00 |
| 4 | 4 | 秋田 三郎 | Akita Saburo | 080-xxxx-xxxx | akita@example.com | 1 | 2018-10-01 00:00:00 | 2018-10-01 00:00:00 |
| 5 | 5 | 武藤 葵 | Mutou Aoi | 080-xxxx-xxxx | mutou@example.com | 1 | 2018-10-01 00:00:00 | 2018-10-01 00:00:00 |
| : | : | : | : | : | : | : | : | : |

[FIG. 6]

222 Ship Management Information

| Ship ID (601) | Ship Type ID (602) | Ship ID of Ship Details Document (603) | Ship Name (Japanese) (604) | Ship Name (English) (605) | Ship Name (Kana) (606) | Nationality of Ship (607) | Port ID (608) | Ship Number (609) | Ship ID Number (610) | Status (611) | Ship IMO (612) | Ship MMSI (613) | Call Sign (614) | Ship Size ID (615) | Created Date and Time (616) | Updated Date and Time (617) |
|---|---|---|---|---|---|---|---|---|---|---|---|---|---|---|---|---|
| 1 | 9 | 1501 | 日本丸 | Nippon Maru | にっぽんまる | Japan | 14100 | 36212 | 36212 | 0 | NULL | NULL | JFLC | 1 | 2018-11-14 05:01:53 | 2018-11-14 05:01:53 |
| 2 | 9 | 1501 | 海王丸 | Kaiwo Maru | かいおうまる | Japan | 16203 | 36216 | 36216 | 1 | NULL | NULL | JFPC | 2 | 2018-11-14 05:01:53 | 2018-11-14 05:01:53 |
| 3 | 9 | 1101 | ロイヤルウイング | Royal Wing | ろいやるういんぐ | Japan | 14100 | 84301 | 84301 | 1 | NULL | 431000547 | JKVX | 3 | 2018-11-14 05:01:53 | 2018-11-14 05:01:53 |
| 4 | 9 | 1004 | だいこく丸 | Daikoku Maru | だいこくまる | Japan | 38201 | 113562 | 113562 | 2 | NULL | 432496000 | 7KQV | 4 | 2018-11-14 05:01:53 | 2018-11-14 05:01:53 |
| : | : | : | : | : | : | : | : | : | : | : | : | : | : | : | : | : |

[FIG. 7]
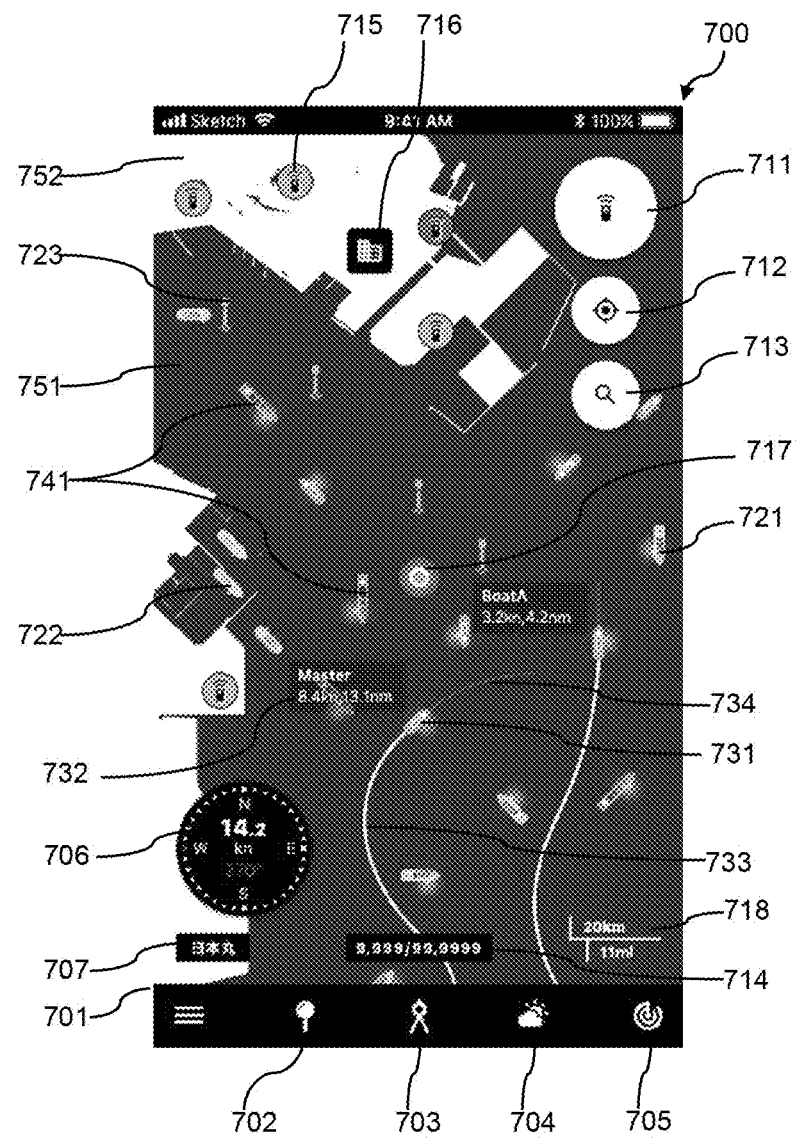

[FIG. 8]

[FIG. 9]
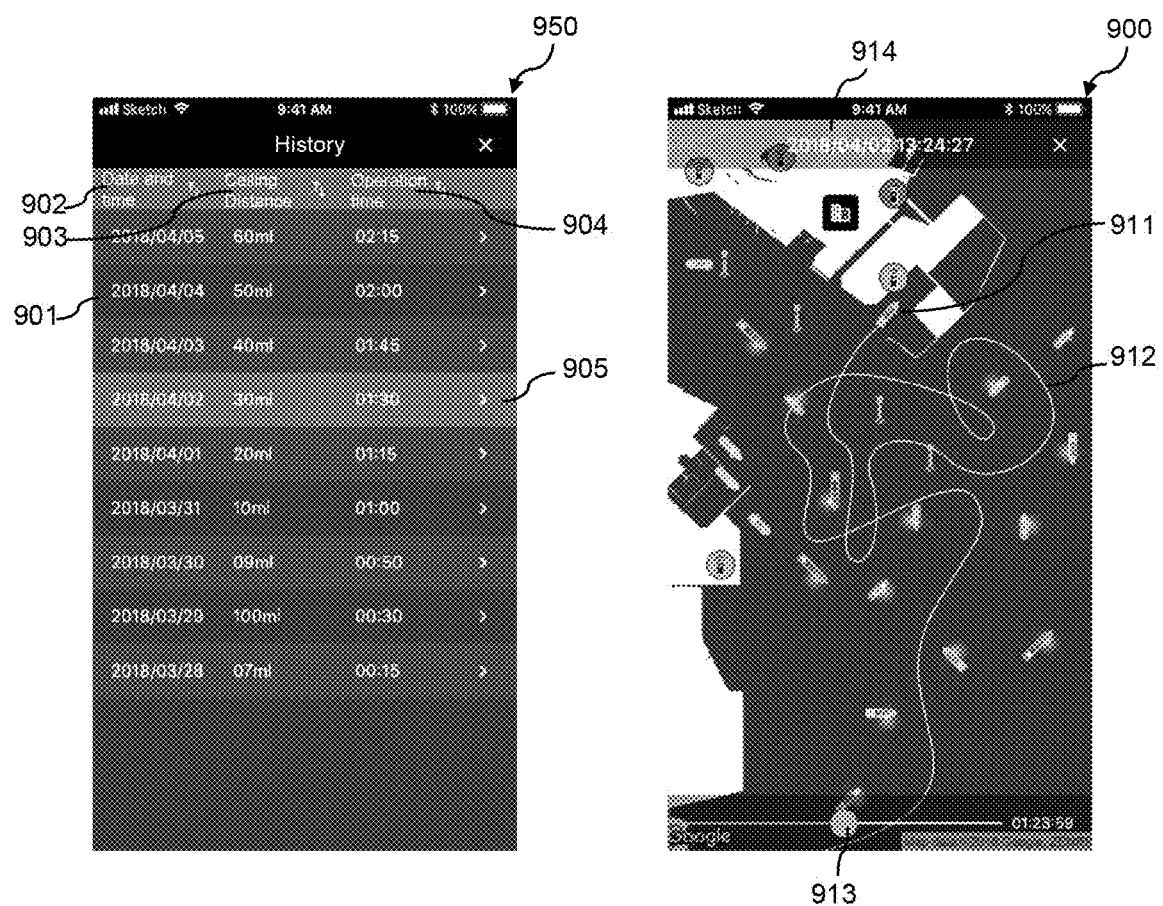

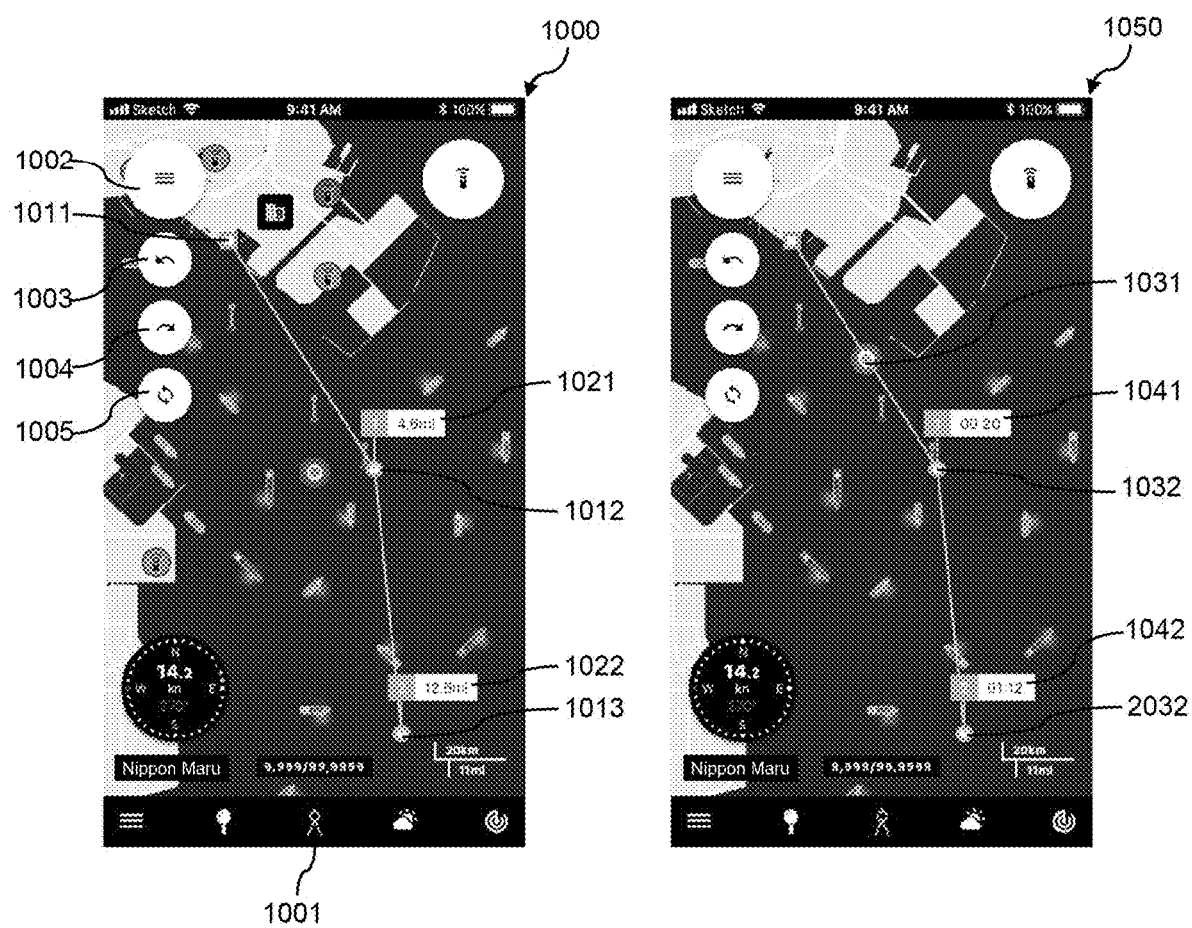
[FIG. 10]

[FIG. 11]
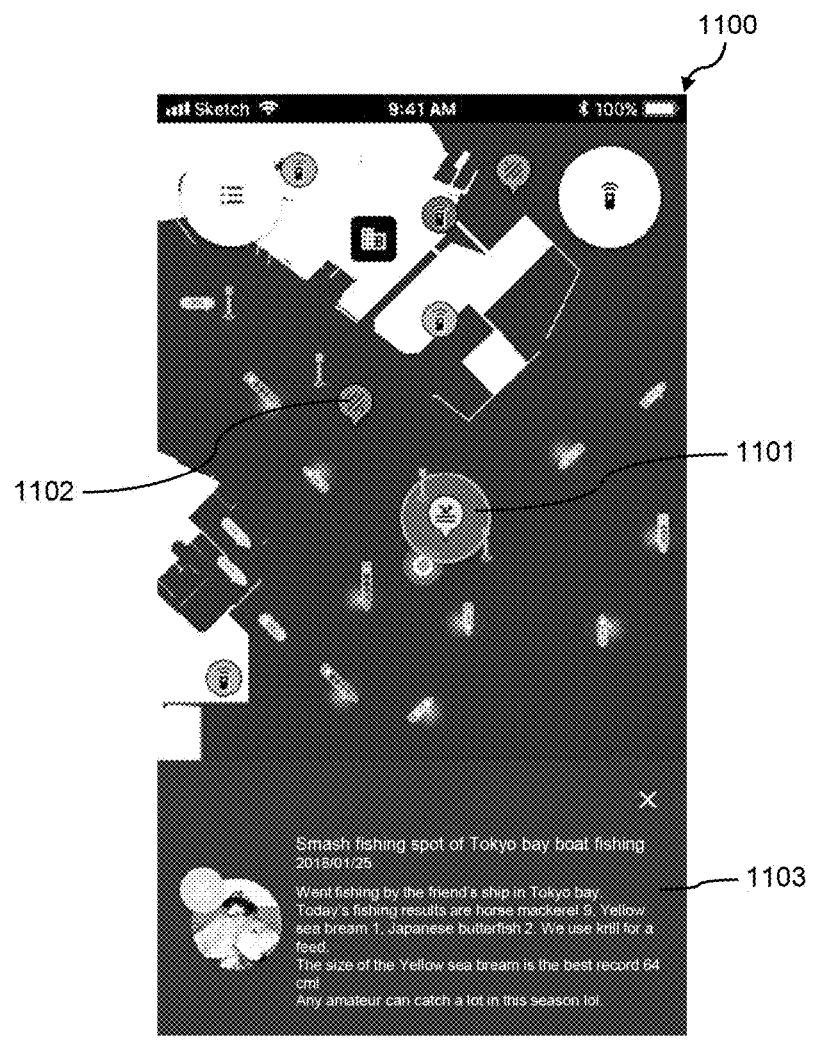

[FIG. 12]
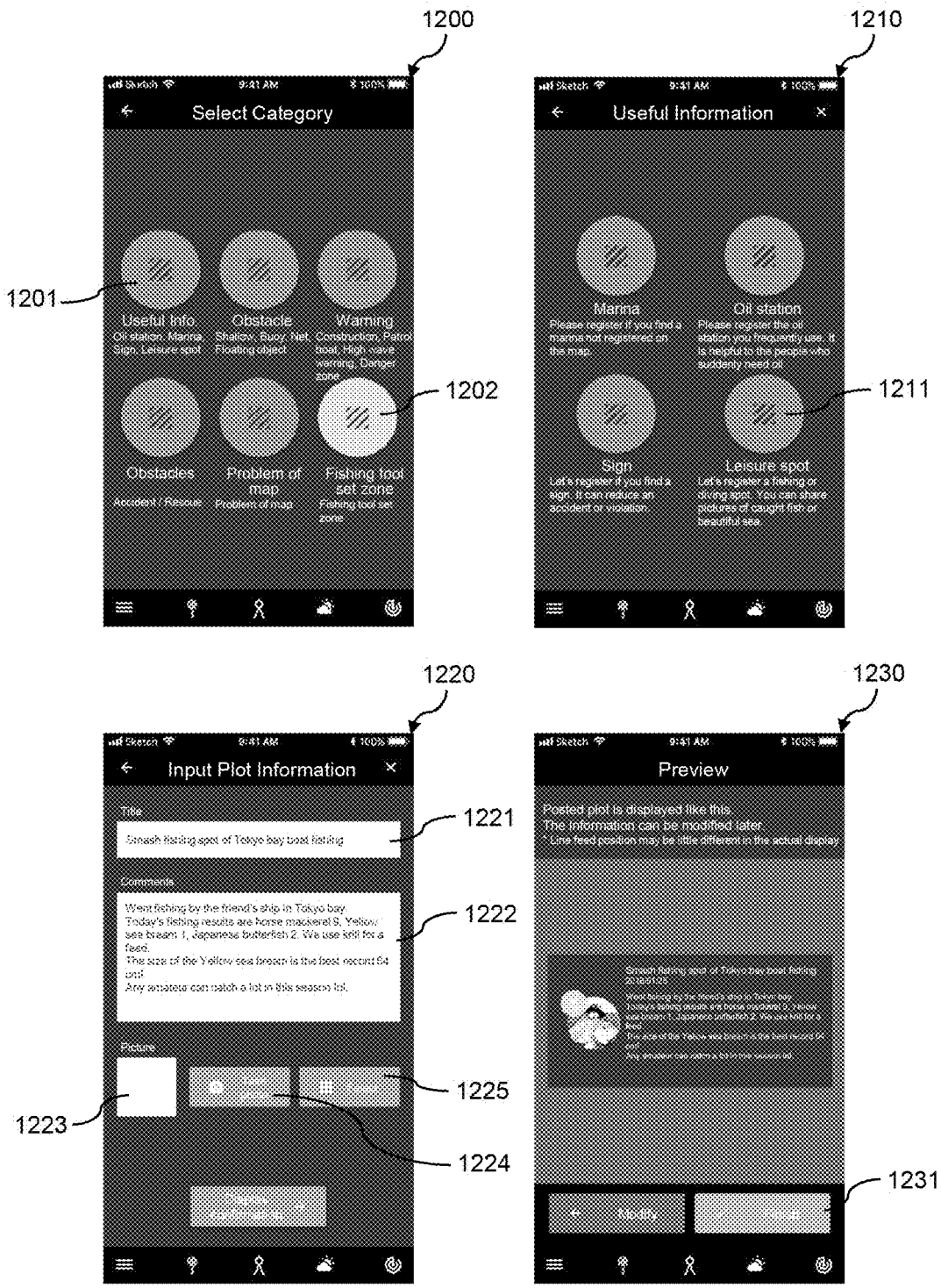

[FIG. 13]
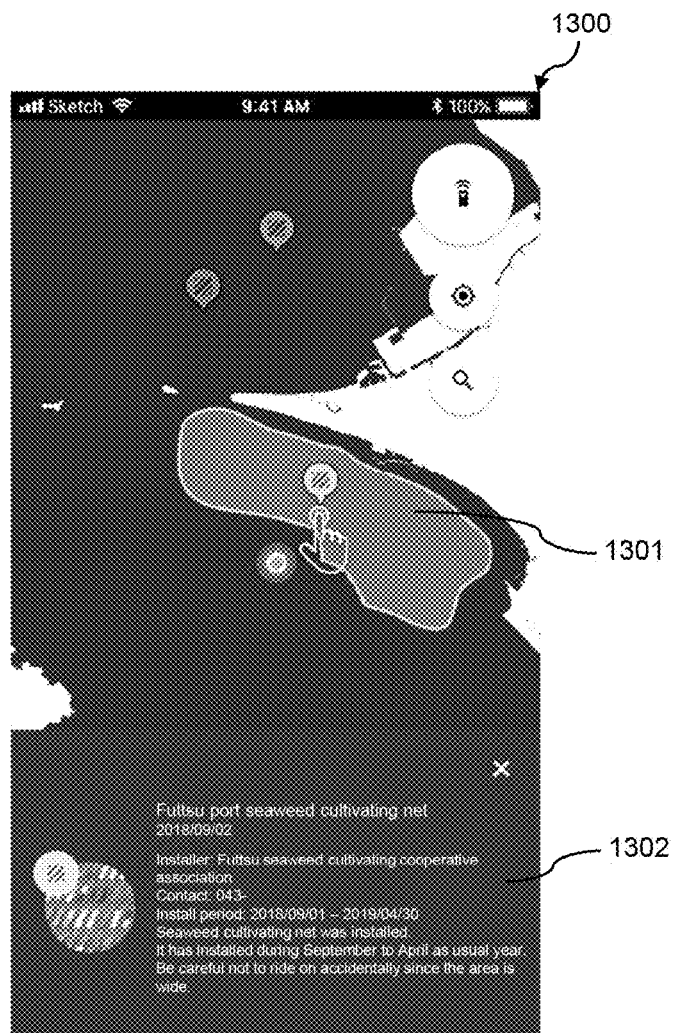

[FIG. 14]
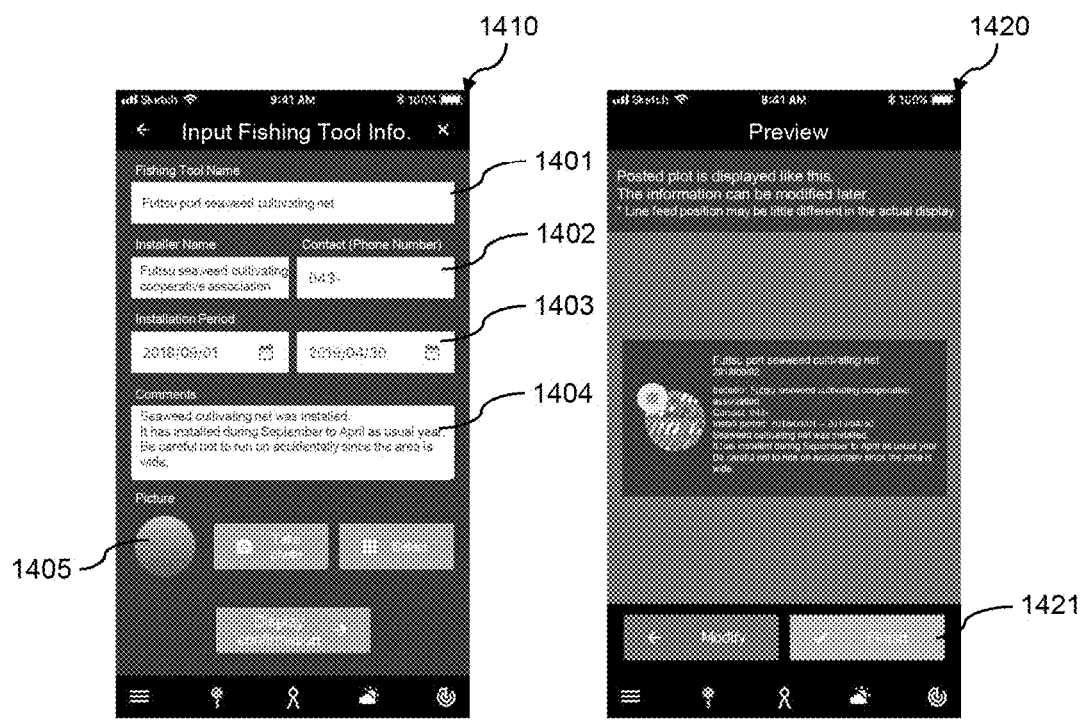

[FIG. 15]
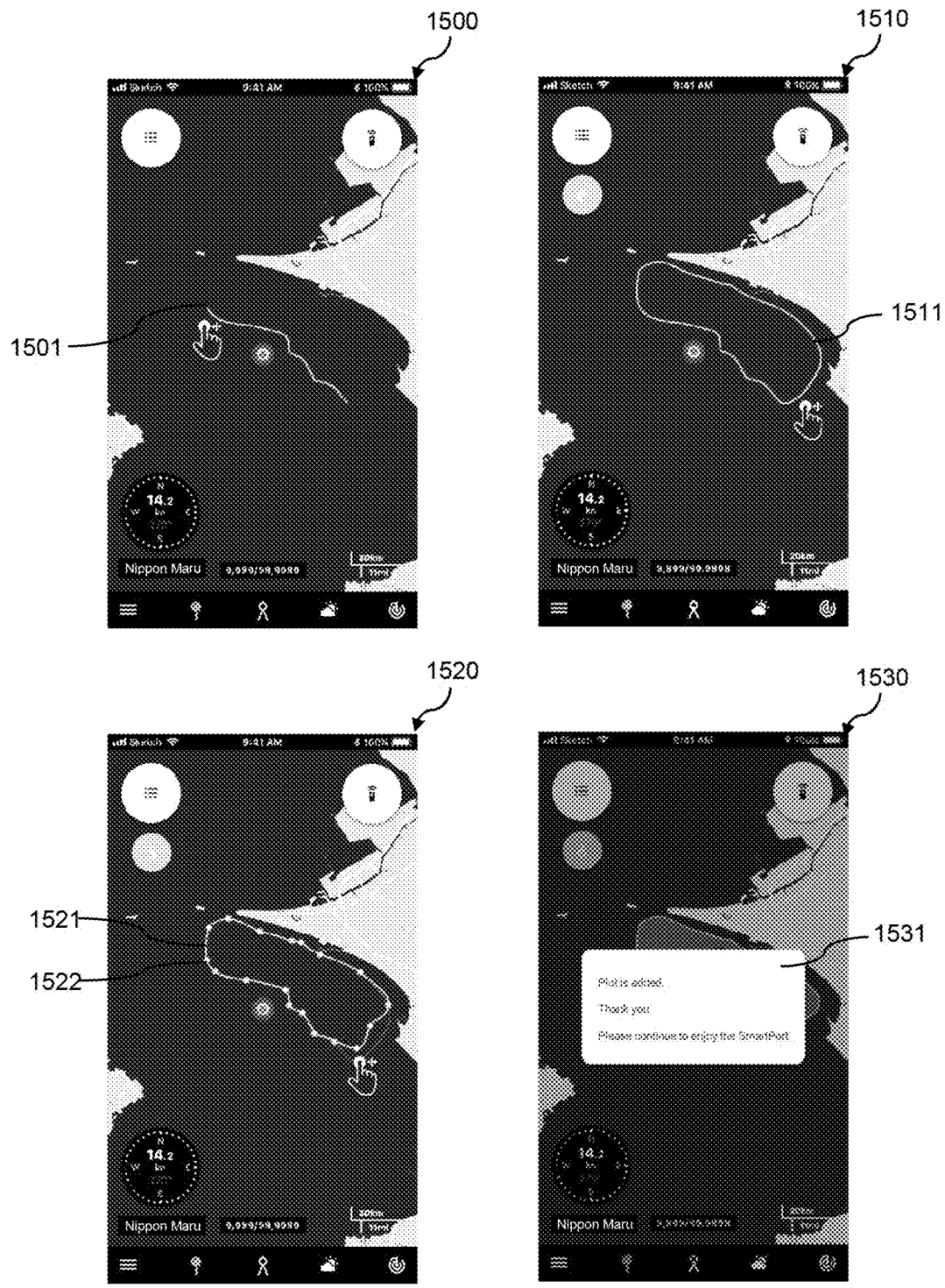

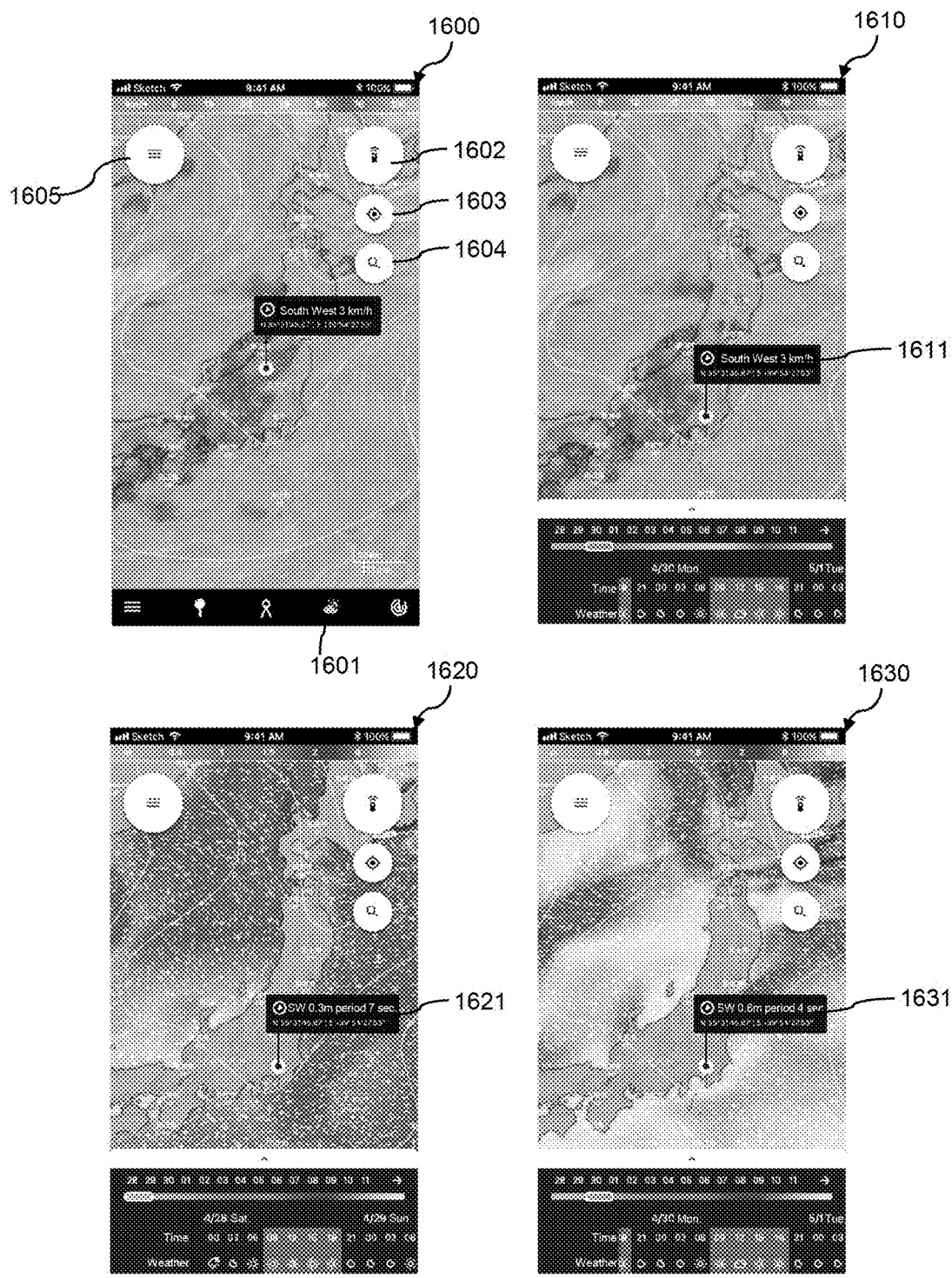
[FIG. 16]

[FIG.17]
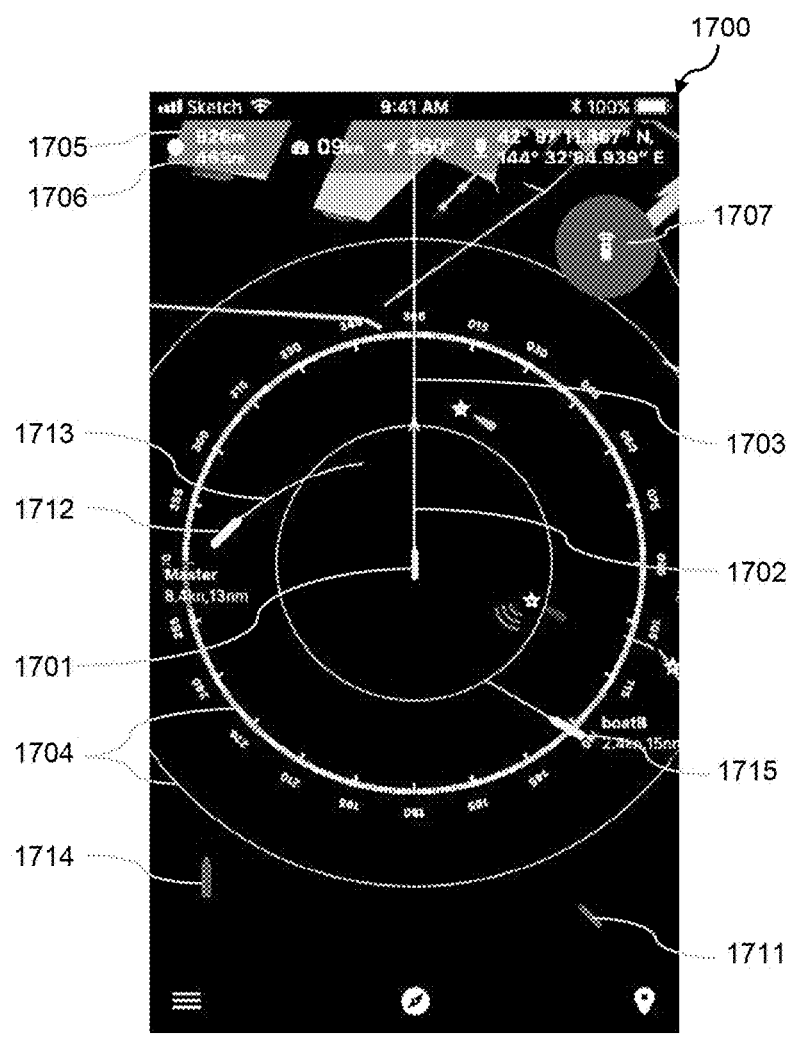

[FIG. 18]
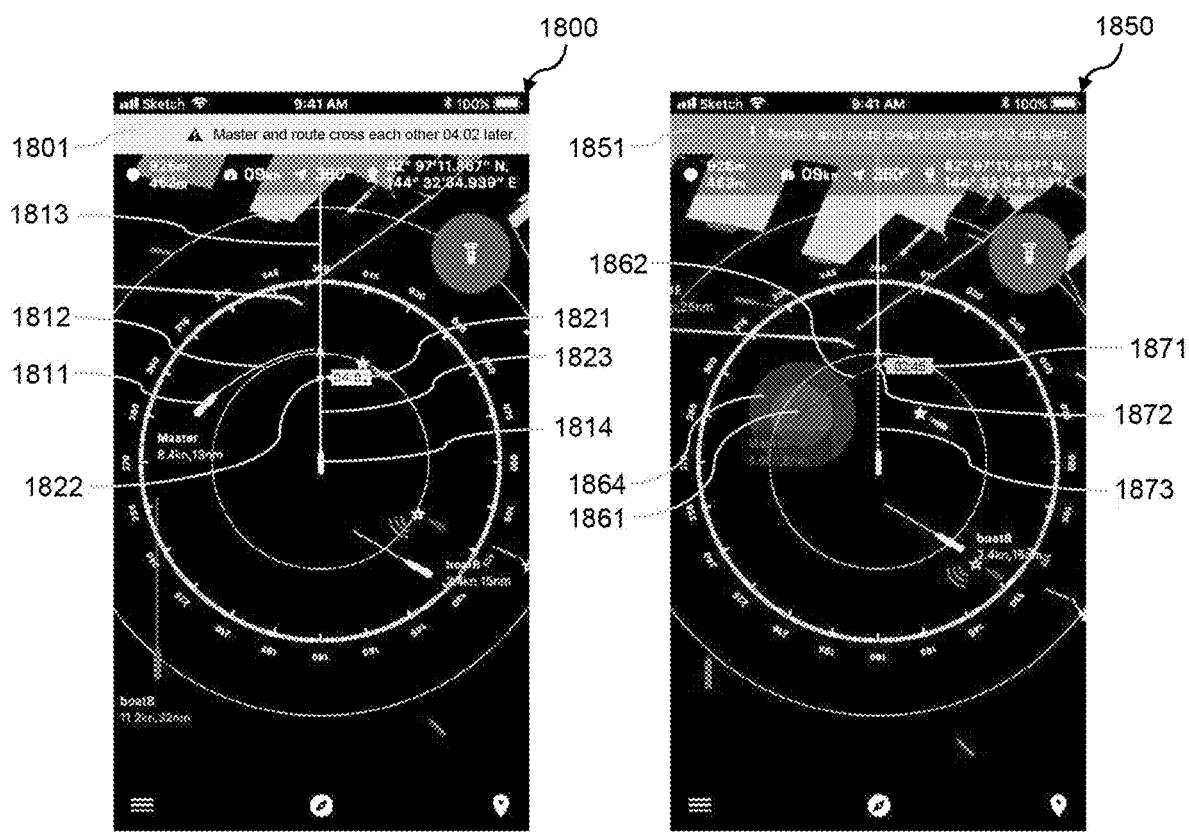

[FIG. 19]
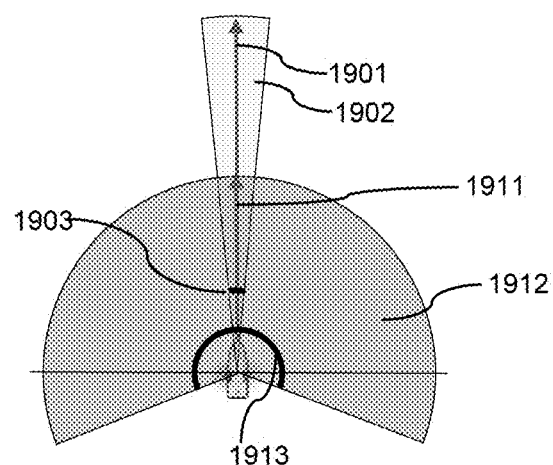

[FIG.20]
(a) In the event that the notification of caution is displayed
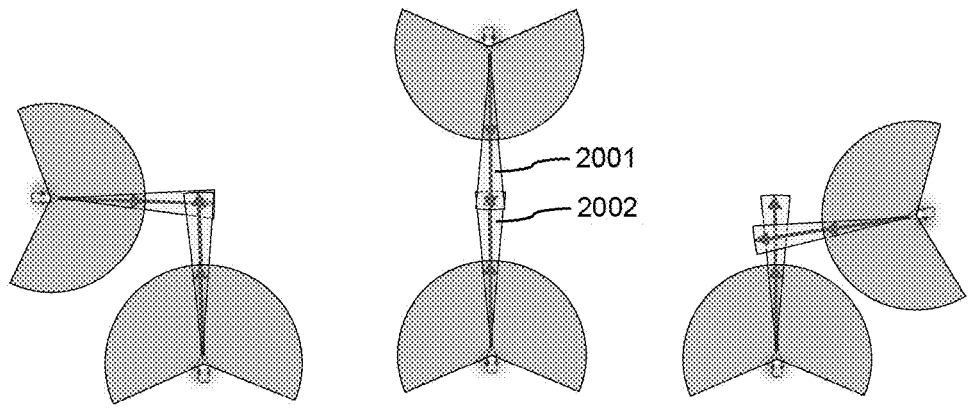
(b) In the event that the notification of caution is displayed
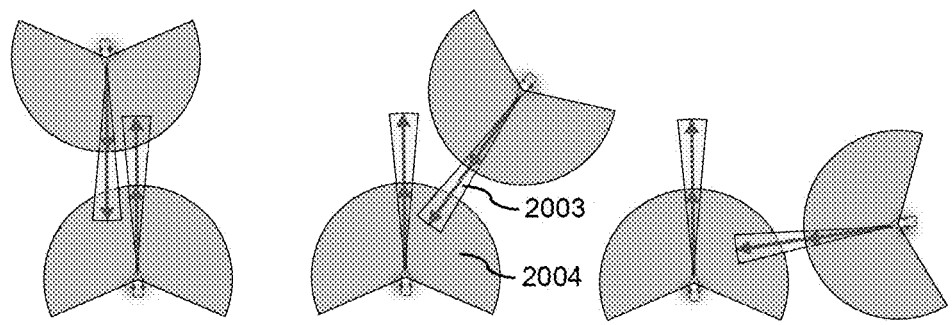
(c) In the event that the notification of warning is displayed
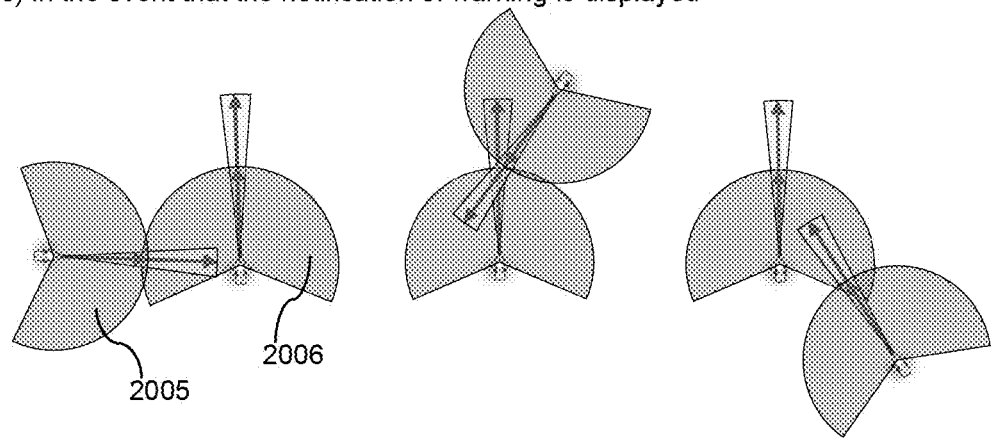

[FIG. 21]
(a) In the event that the notification of caution is displayed
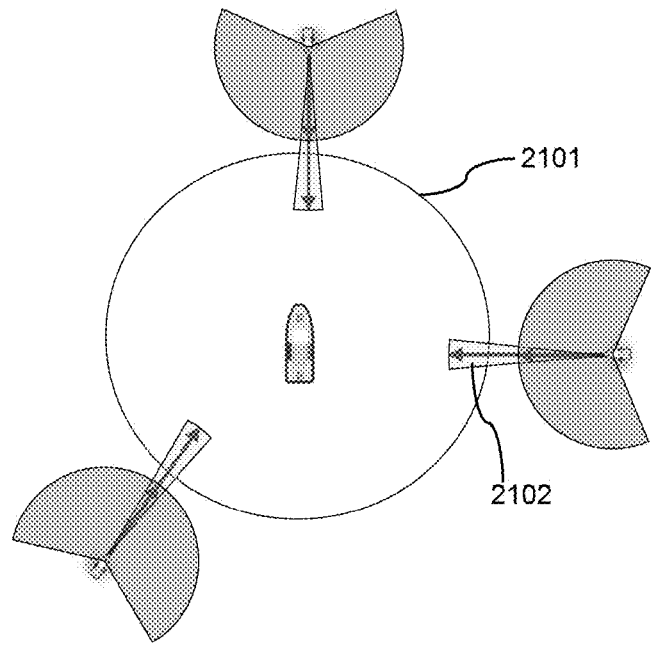
(b) In the event that the notification of warning is displayed
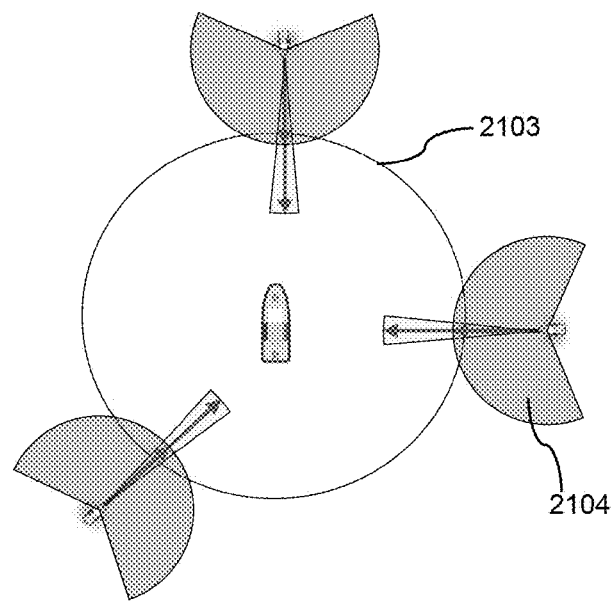

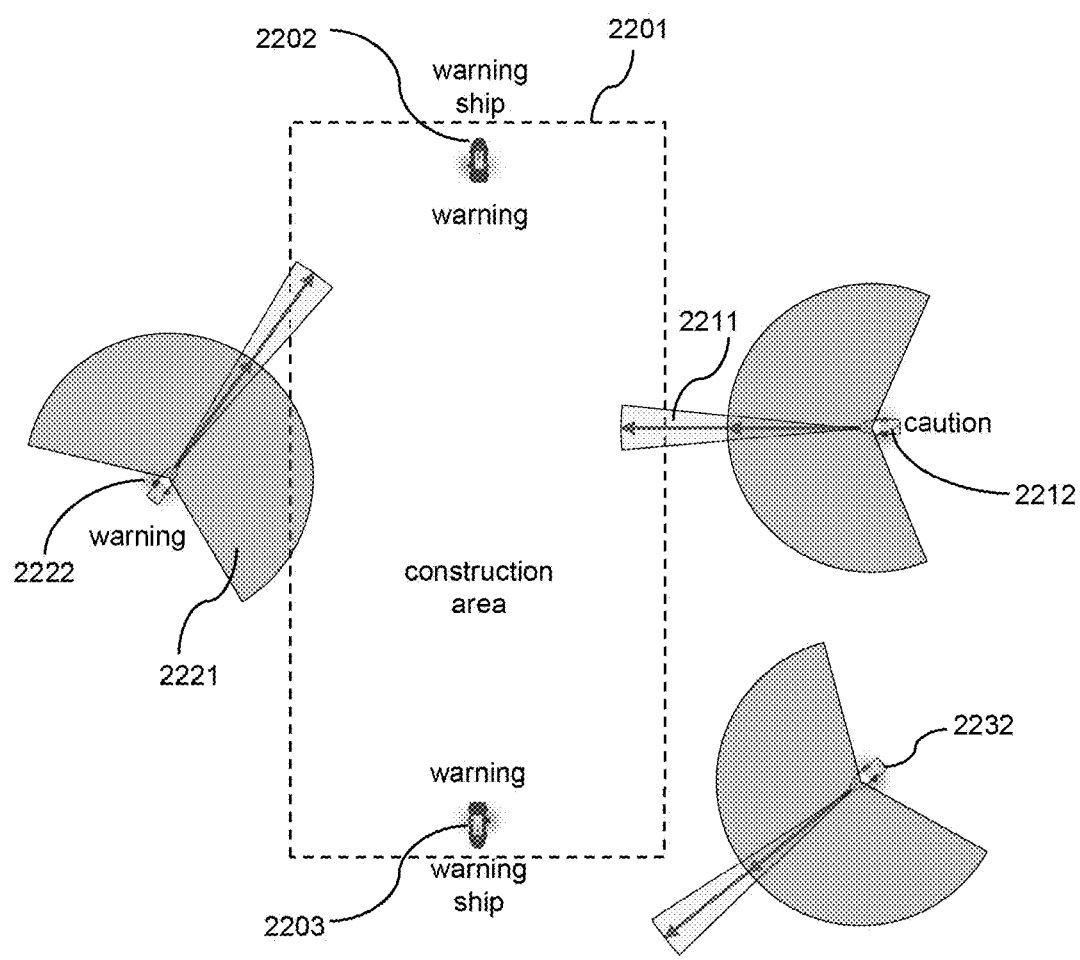
[FIG. 22]

[FIG. 23]
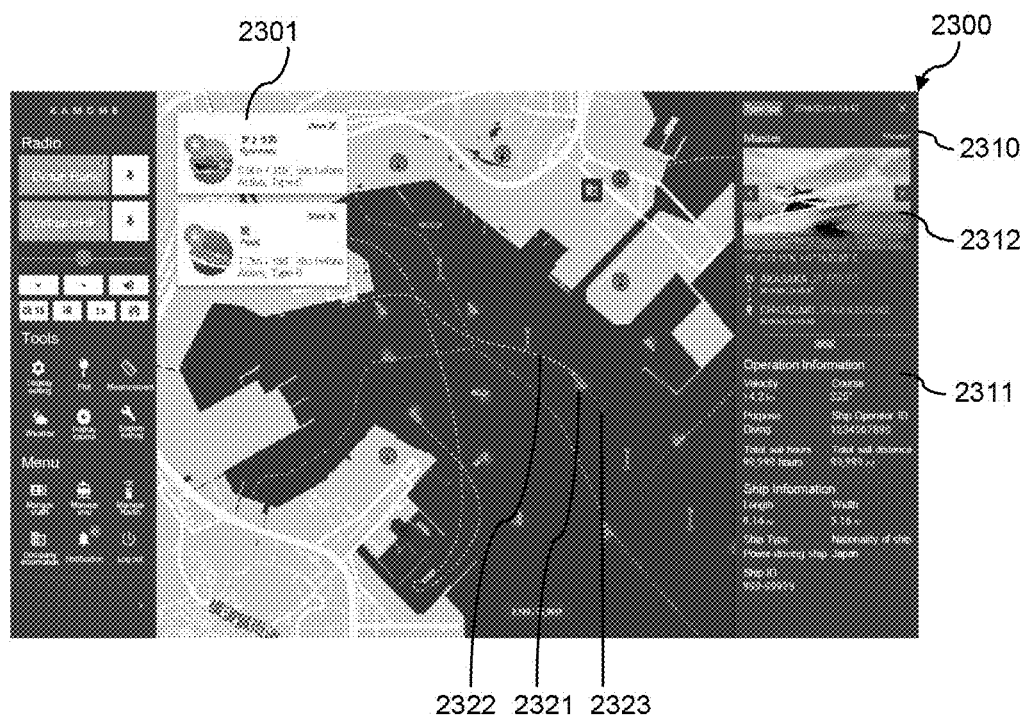

[FIG. 24]
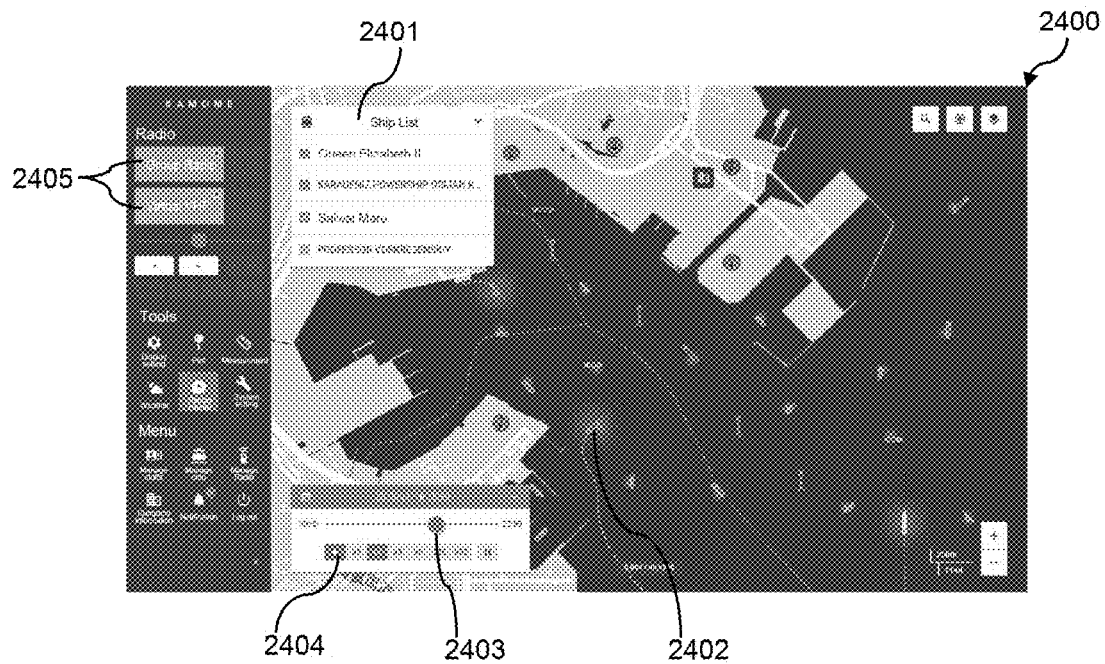
[FIG. 25]
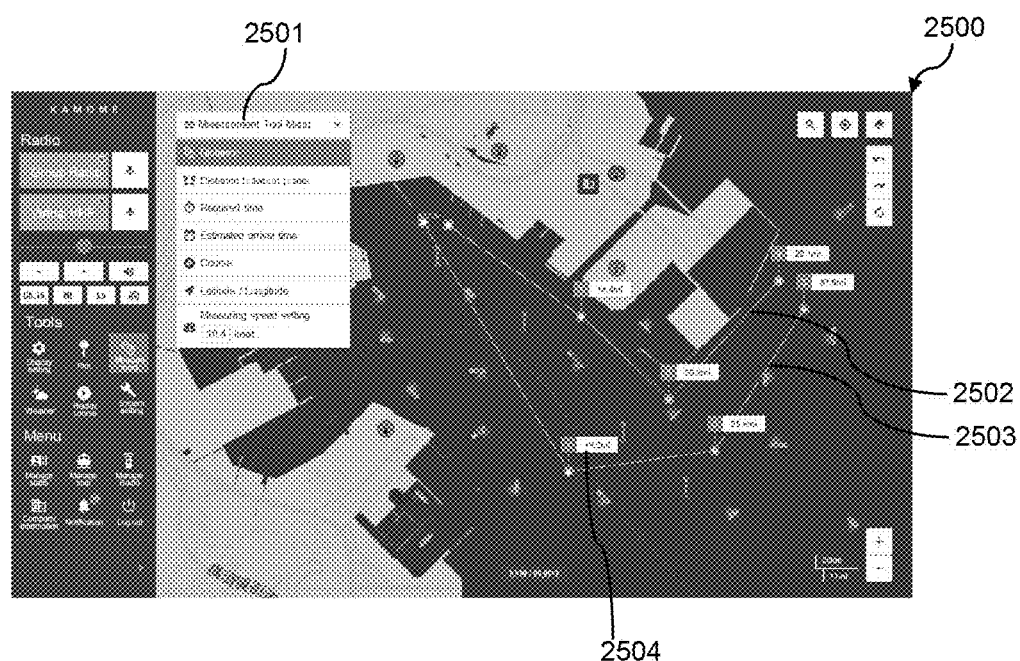

[FIG. 26]
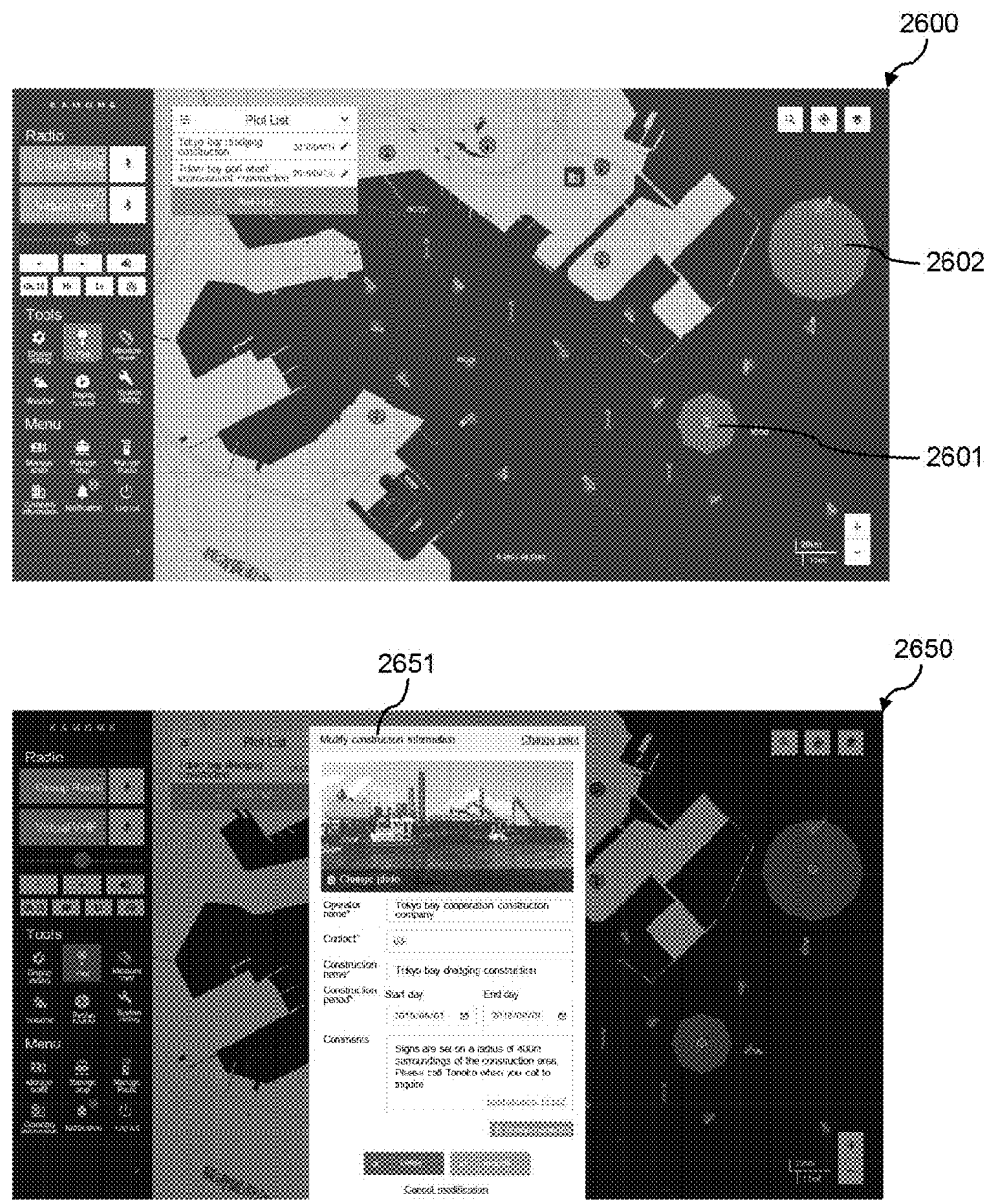

[FIG. 27]
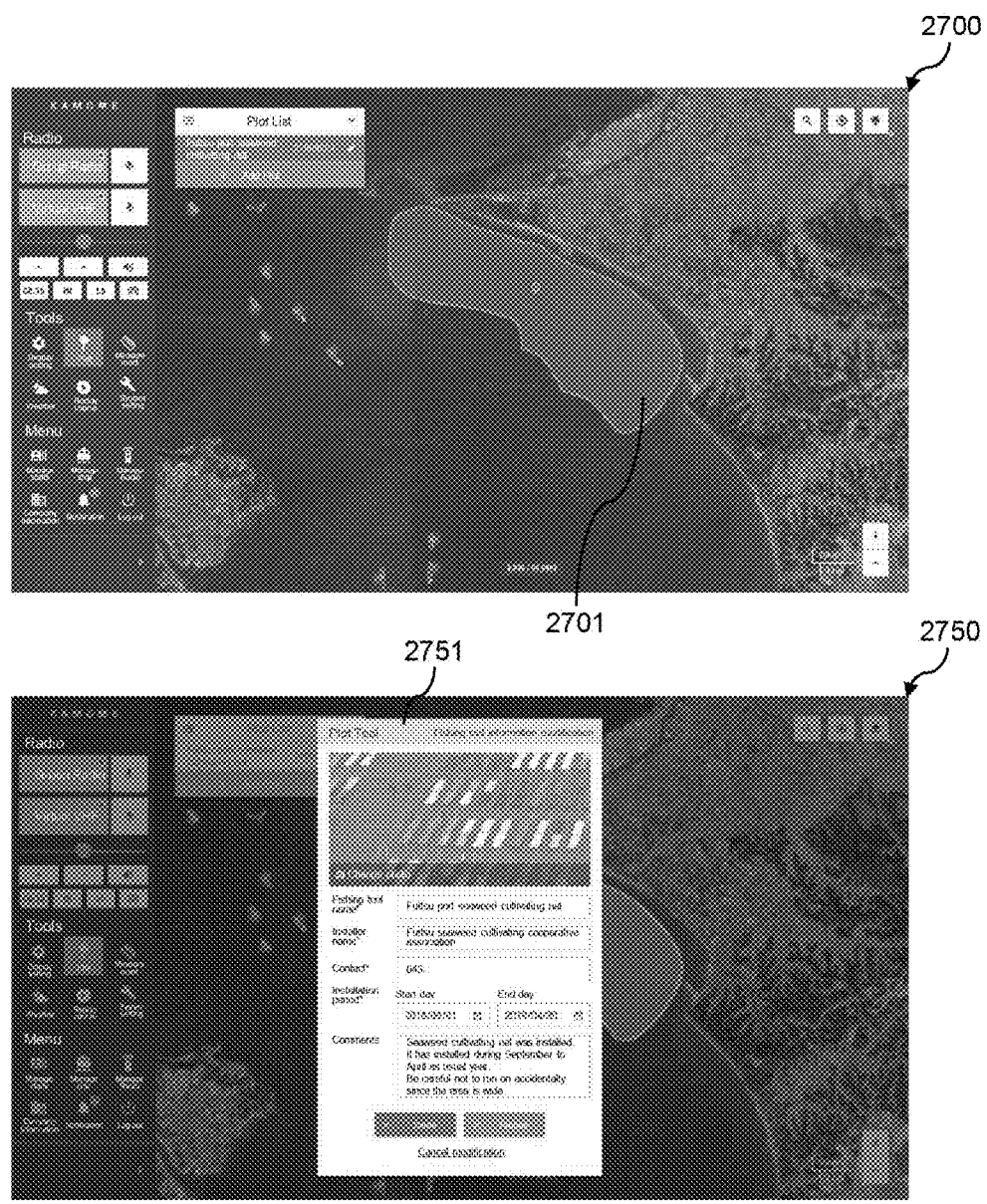

[FIG. 28]

(a) Navigation Record Information

2800 Navigation record information

| Navigation Record ID | User ID | Ship ID | Corporate ID | Project ID | Status | Sart Time of Operation | End Time of Operation | Purpose | Total Operating Distance | Max Operating Speed | Create Date and Time | Update Date and Time |
|---|---|---|---|---|---|---|---|---|---|---|---|---|
| 11302 | 1 | 2 | 1 | 1 | 0 | 2018/10/1 12:36 | 2018/10/1 14:28 | Leisure | 68005 | 67 | 2018/10/1 12:36 | 2018/10/1 14:28 |
| 11303 | 4 | 7 | 2 | 9 | 0 | 2018/10/2 10:02 | 2018/10/2 13:54 | Fishing | 28139 | 36 | 2018/10/2 10:02 | 2018/10/2 13:54 |
| ⋮ | ⋮ | ⋮ | ⋮ | ⋮ | ⋮ | ⋮ | ⋮ | ⋮ | ⋮ | ⋮ | ⋮ | ⋮ |

(b) Ship Position Information

2820 Ship position information

| Ship Position ID | Ship Operation History ID | Latitude | Longitude | Direction | Distance (m) | Speed (km/h) | Create Date and Time | Update Date and Time |
|---|---|---|---|---|---|---|---|---|
| 122 | 11302 | 139.728 | 35.6198 | 37 | 10.833 | 39 | 2018-10-01 12:36:00 | 2018-10-01 12:36:00 |
| 123 | 11302 | 139.724 | 35.626 | 40 | 11.111 | 40 | 2018-10-01 12:36:01 | 2018-10-01 12:36:01 |
| 124 | 11302 | 139.716 | 35.6339 | 43 | 11.389 | 41 | 2018-10-01 12:36:02 | 2018-10-01 12:36:02 |
| 125 | 11302 | 139.71 | 35.6467 | 46 | 11.667 | 42 | 2018-10-01 12:36:03 | 2018-10-01 12:36:03 |
| 126 | 11302 | 139.701 | 35.6589 | 49 | 11.944 | 43 | 2018-10-01 12:36:04 | 2018-10-01 12:36:04 |
| 127 | 11302 | 139.703 | 35.6706 | 52 | 12.222 | 44 | 2018-10-01 12:36:05 | 2018-10-01 12:36:05 |
| 128 | 11302 | 139.702 | 35.6831 | 55 | 12.500 | 45 | 2018-10-01 12:36:06 | 2018-10-01 12:36:06 |
| ⋮ | ⋮ | ⋮ | ⋮ | ⋮ | ⋮ | ⋮ | ⋮ | ⋮ |

[FIG. 29]

(a) Plot Information                                                                      2900 Plot Information

| Plot ID | Account ID | Plot Category ID | Title | Plot Type Flag | Plot Detailed Information ID | Created Date and Time | Updated Date and Time |
|---|---|---|---|---|---|---|---|
| 1 | 2 | 1 | Leisure Spot | 1 | 11 | 2018-10-01 00:00:00 | 2018-10-01 00:00:00 |
| 2 | 3 | 2 | Marina | 1 | 12 | 2018-10-01 00:00:00 | 2018-10-01 00:00:00 |
| 3 | 4 | 3 | Sign | 1 | 13 | 2018-10-01 00:00:00 | 2018-10-01 00:00:00 |
| 4 | 5 | 4 | Fishing equipment installation area | 2 | 14 | 2018-10-01 00:00:00 | 2018-10-01 00:00:00 |
| ⋮ | ⋮ | ⋮ | ⋮ | ⋮ | ⋮ | ⋮ | ⋮ |

(b) Plot Details Information                                                              2920 Plot Details Information

| Plot Detail ID | Photo ID | Business name | Contact Address | Start date of work | End date of work | Comments | Created Date and Time | Updated Date and Time |
|---|---|---|---|---|---|---|---|---|
| 11 | 10 | installer010 | 121000010 | 2018-10-01 | 2018-10-31 | Fishing spot comments | 2018-10-01 00:00:00 | 2018-10-01 00:00:00 |
| 12 | 12 | NULL | NULL | NULL | NULL | Port comments | 2018-10-01 00:00:00 | 2018-10-01 00:00:00 |
| 13 | 13 | NULL | NULL | NULL | NULL | Accidents comments | 2018-10-01 00:00:00 | 2018-10-01 00:00:00 |
| 14 | 16 | installer016 | 121000016 | 2018-10-01 | 2018-10-31 | fishing equipment installation comments | 2018-10-01 00:00:00 | 2018-10-01 00:00:00 |
| ⋮ | ⋮ | ⋮ | ⋮ | ⋮ | ⋮ | ⋮ | ⋮ | ⋮ |

(c) Plot Position Information                                                             2940 Plot Position Information

| Plot Point ID | Plot ID | Latitude | Longitude | Order | Created Date and Time | Updated Date and Time |
|---|---|---|---|---|---|---|
| 22 | 1 | 35.4714 | 139.867 | 1 | 2018-11-14 05:01:42 | 2018-11-14 05:01:42 |
| 23 | 2 | 35.4747 | 139.876 | 1 | 2018-11-14 05:01:42 | 2018-11-14 05:01:42 |
| 24 | 3 | 35.4767 | 139.874 | 1 | 2018-11-14 05:01:42 | 2018-11-14 05:01:42 |
| 25 | 4 | 35.4672 | 139.875 | 1 | 2018-11-14 05:01:42 | 2018-11-14 05:01:42 |
| 26 | 4 | 35.4682 | 139.895 | 2 | 2018-11-14 05:01:42 | 2018-11-14 05:01:42 |
| 27 | 4 | 35.4689 | 139.882 | 3 | 2018-11-14 05:01:42 | 2018-11-14 05:01:42 |
| ⋮ | ⋮ | ⋮ | ⋮ | ⋮ | ⋮ | ⋮ |

[FIG. 30]
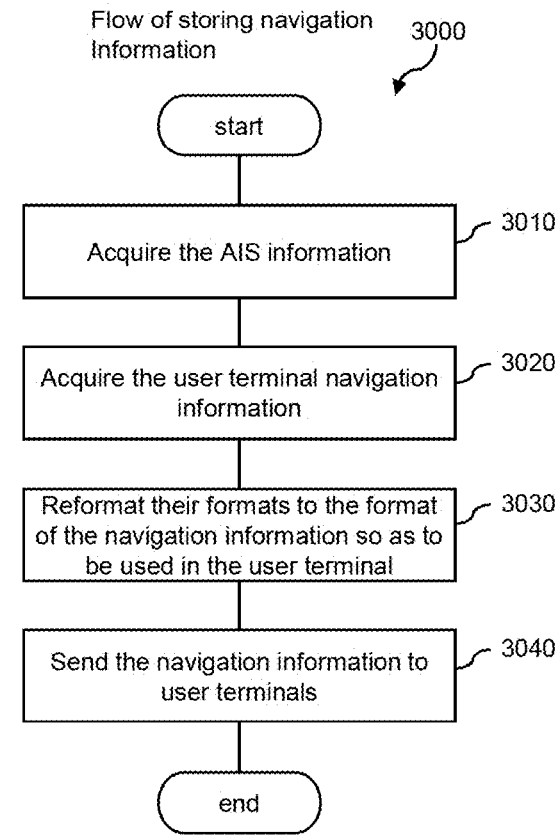
[FIG. 31]
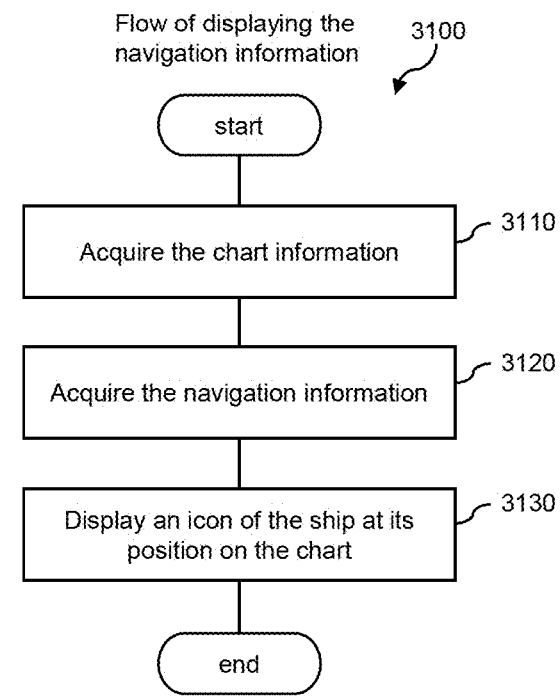

[FIG. 32]
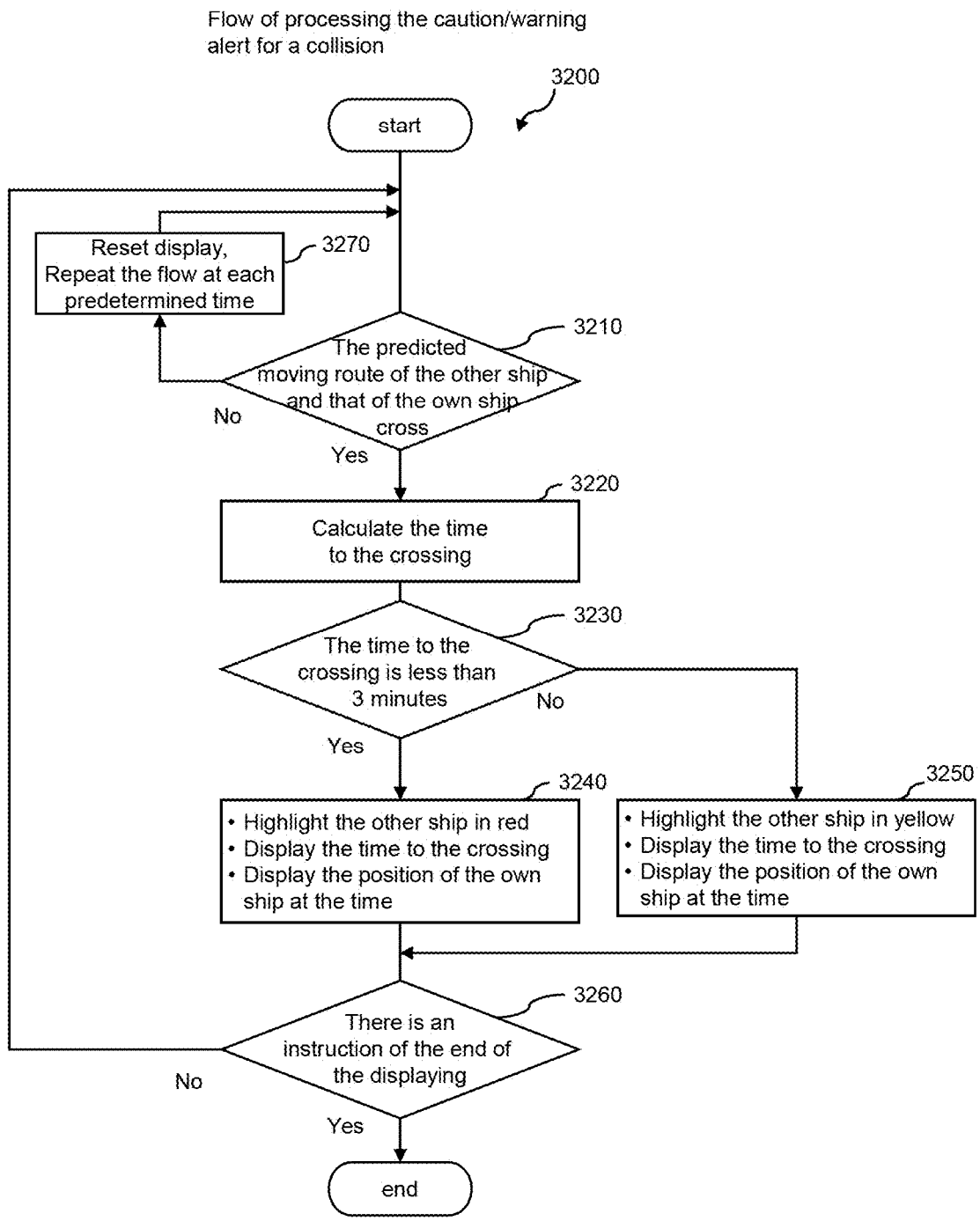

[FIG. 33]
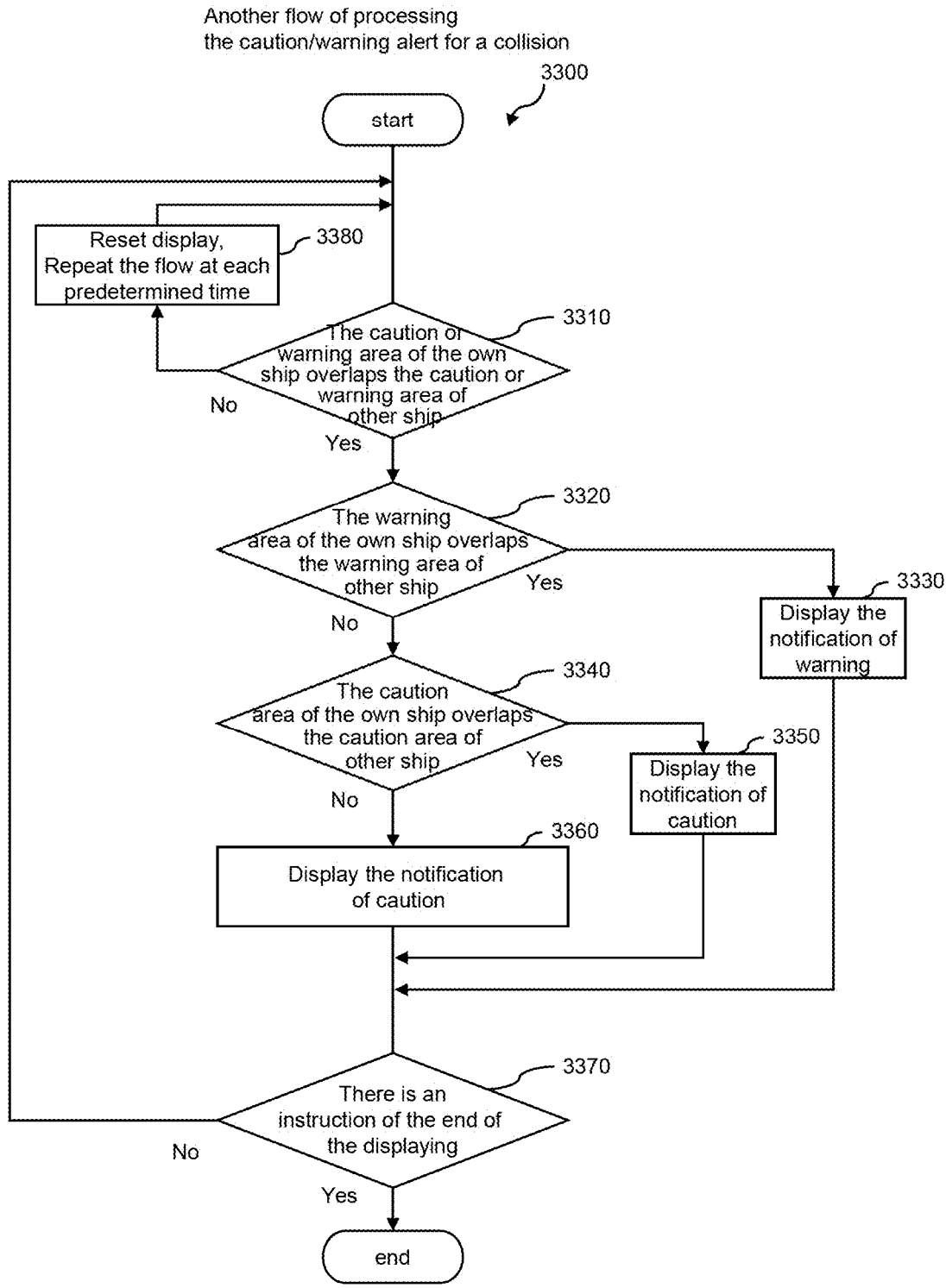

[FIG. 34]
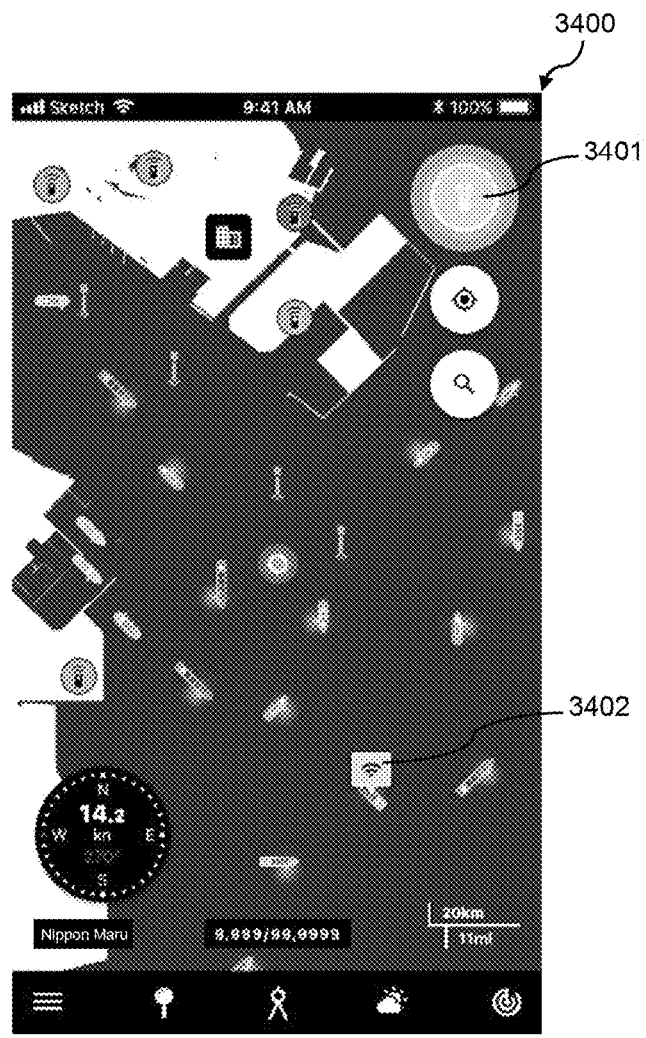

[FIG. 35]
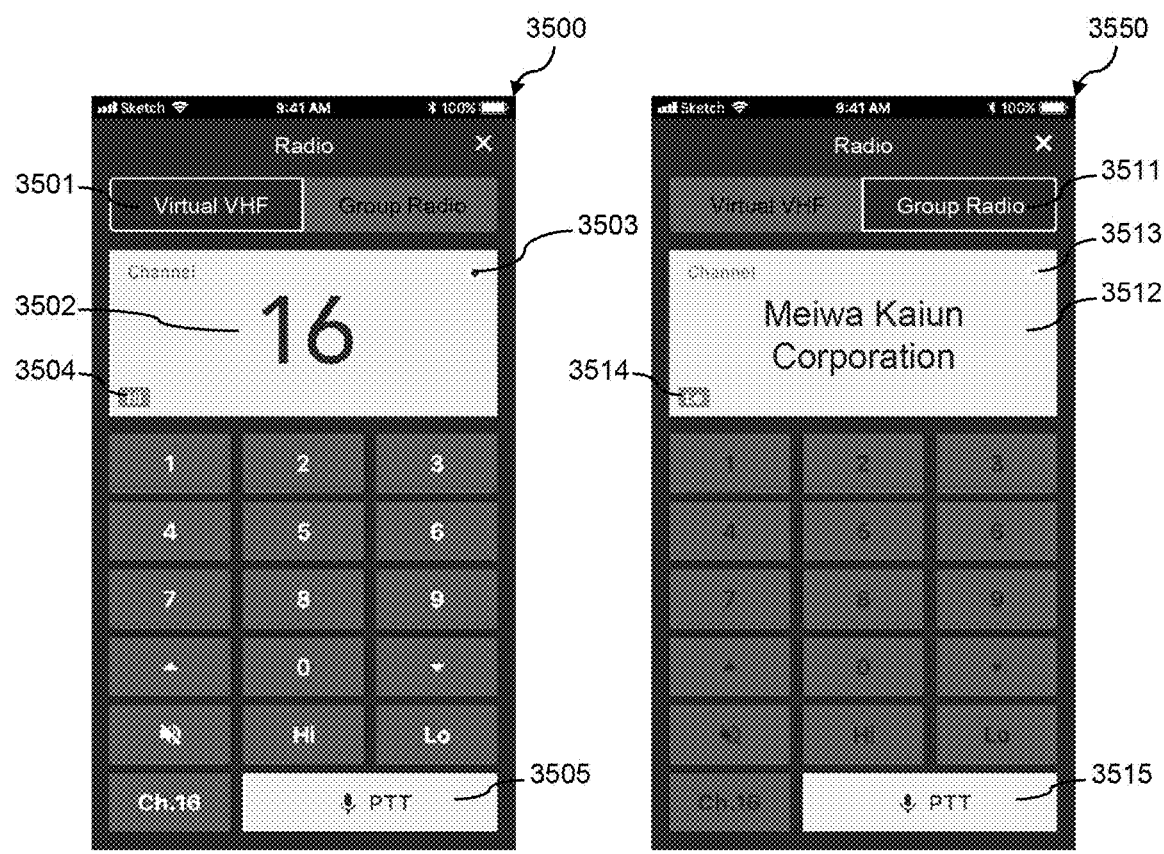

[FIG. 36]
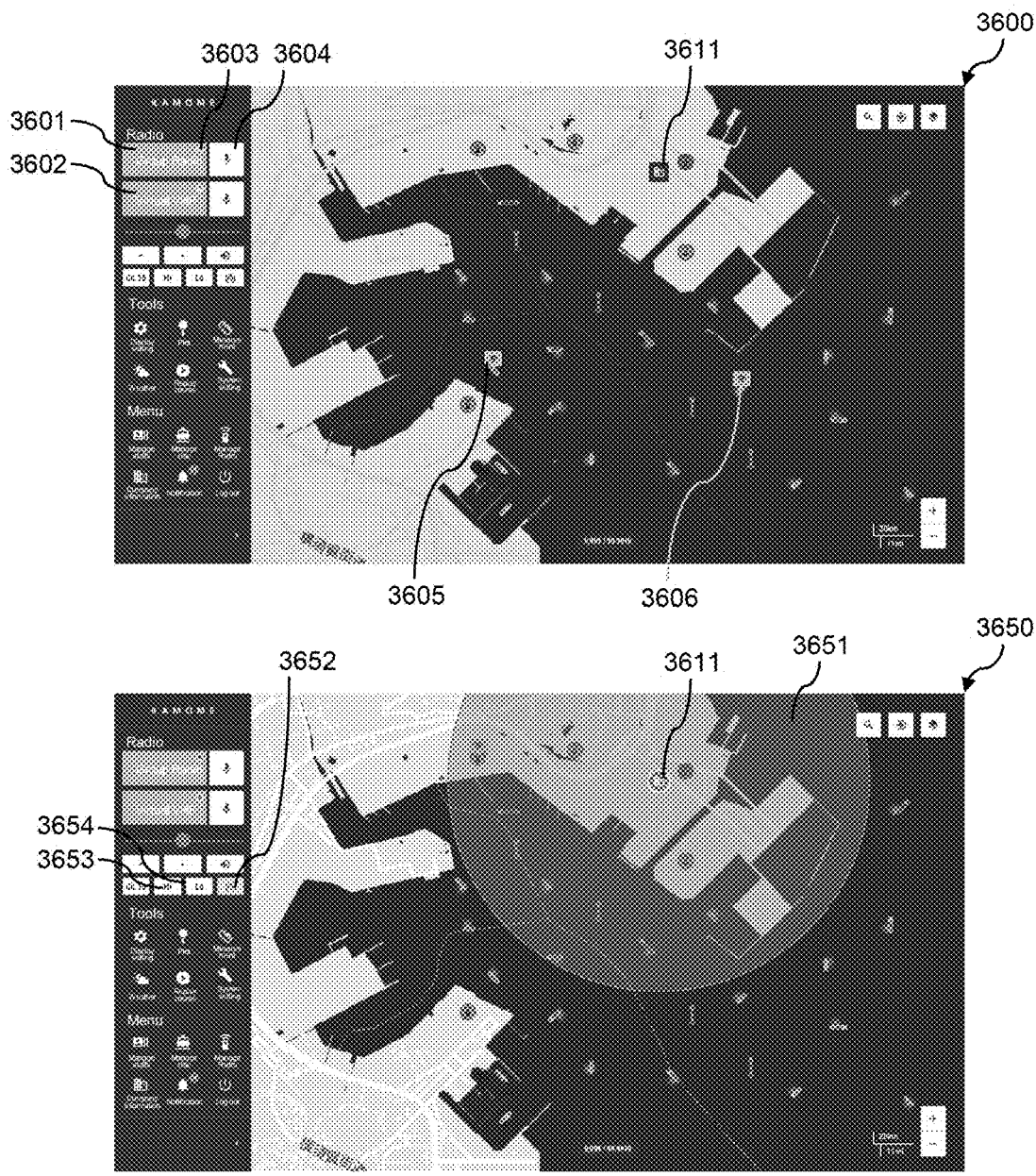

[FIG. 37]
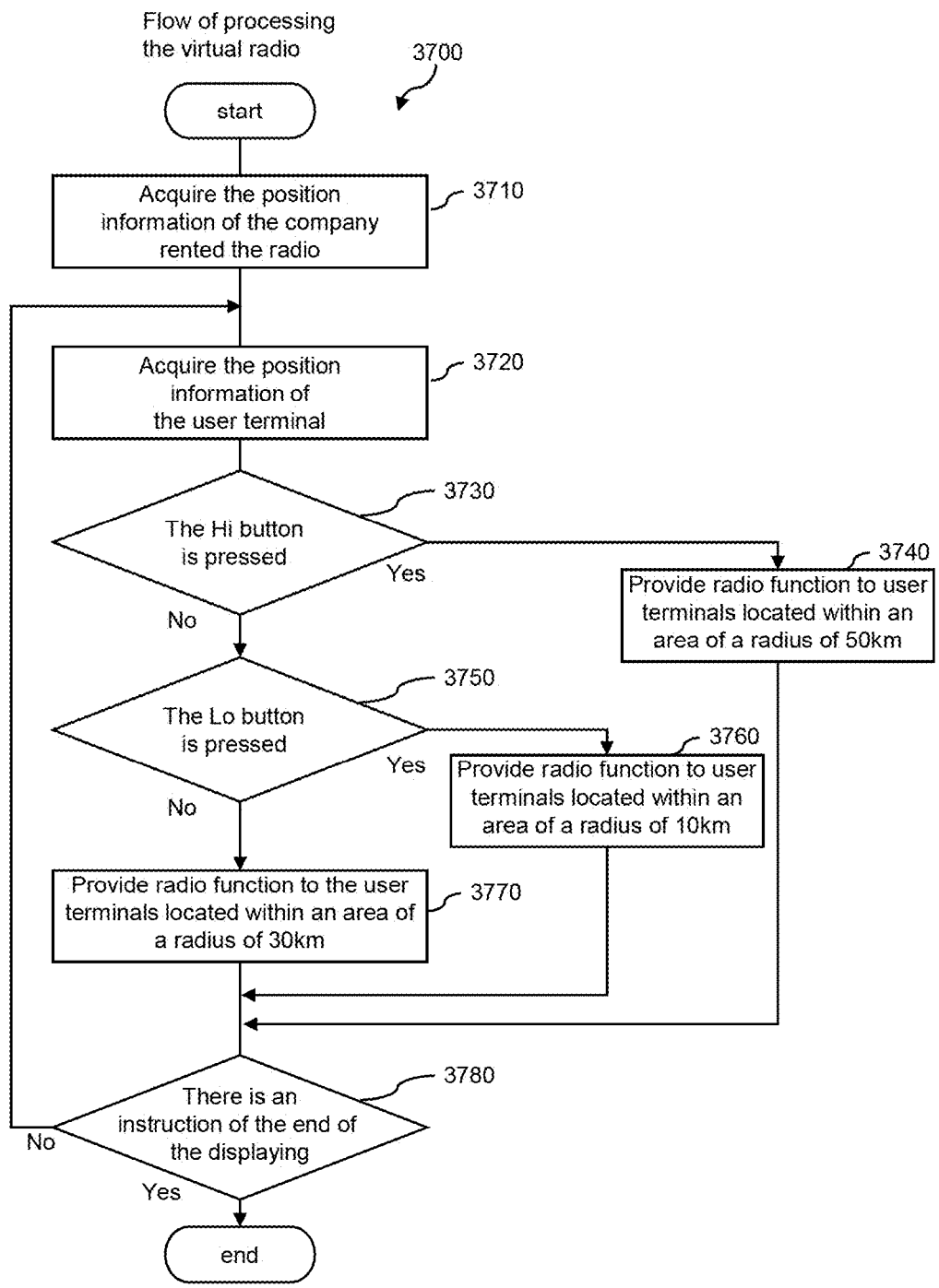

SHIP MOVEMENT-SHARING NAVIGATION ASSISTANCE SYSTEM

TECHNICAL FIELD

The present invention relates to a Ship Movement-Sharing Navigation Support System.

BACKGROUND ART

As a prior art of the present technical field, Japanese Unexamined Patent Application Publication No. 2001-211111 (Patent Literature 1) is available. In this publication, it is described that "a ship-land intercommunication system includes an on-board information processing apparatus 2 disposed in the ship 1 for collecting on-board data necessary for the operation management of the ship 1 and for sending the on-board data to a marine satellite communication apparatus 22. The ship-land intercommunication system also includes a land-based information processing apparatus 5 for processing a predetermined information processing to the on-board data which is sent via the marine satellite communication apparatus 22. The on-board information processing apparatus 2 comprises a server equipment 20, an engine monitor panel data logger processing apparatus 21, and the marine satellite communication apparatus 22. The processing apparatus 21 collects data necessary for the operation management of the ship and converts the collected data into a numerical data. The converted numerical data is taken into the server equipment 20, and the data is processed and stored therein, and then the data is sent to the marine satellite communication apparatus 22 as on-board data in the ship (see a summary)."

In addition, Japanese Unexamined Patent Application Publication No. 2002-157309 (Patent Literature 2) is available. In this publication, it is described that "a method includes a step of taking in and recording a ship information of at least an engine section of the operated ship into an on-board personal computer 1 automatically as a ship information, a step of inputting and storing the recorded data into a data server 8 of a system management company 7 which is disposed on a land side via a communication satellite 6, and a step of enabling to access to the data server 8 from an authorized client computer 10 on a land side via the Internet so as to brows the ship information (see summary)."

CITATION LIST

Patent Literature

[Patent Literature 1] JP-A-2001-211111
[Patent Literature 2] JP-A-2002-157309

SUMMARY OF THE INVENTION

Technical Problem

According to the above-mentioned Patent Literature 1, a mechanism for transmitting the on-board data acquired from various sensors in the ship to the land-based communication facility by using the satellite communication is described. Also, according to the above-mentioned Patent Document 2, a mechanism for taking in the ship information of the engine section of the ship into the on-board computer in the ship, inputting the data to the land-side data server via the communication satellite, and enabling to browse the data from the client personal computer is described. However, according to both literatures 1 and 2, only a configuration which needs an expensive electronic equipment installed on the ship is described, and there is no disclosure of utilizing an inexpensive and simple portable user terminal such as a smartphone or a tablet terminal instead of that.

It is therefore an object of the present invention to provide a Ship Movement-Sharing Navigation Support System utilizing an inexpensive and simple portable user terminal such as a smart phone or a tablet terminal.

Solution to Problem

In order to solve the above-mentioned problems, for example, a configuration described in the claims is adopted.

The present application includes a plurality of means for solving the above-mentioned problems, and as an example thereof, a method for navigating a ship is provided. The method comprises receiving a first position information and a second position information from a management server having a storage means for storing the first position information of a first ship and the second position information of a second ship wherein the first position information is received via a mobile telephone network from a user terminal used in the first ship and the second position information is transmitted via VHF radio from an AIS (Automatic Identification System) device used in the second ship and received via an AIS system; displaying an icon indicating the first ship at the first position information on a nautical chart, and an icon indicating the second ship at the second position information on the nautical chart; and displaying a track of the first position information of the first ship and a track of the second position information of the second ship for a predetermined period from past to present.

Advantageous Effects of Invention

It is possible to provide a Ship Movement-Sharing Navigation Support System utilizing an inexpensive and simple portable user terminal such as a smart phone or a tablet terminal.

Other problems, configurations and effects other than those described above will be clarified by the following description of the embodiment.

BRIEF DESCRIPTION OF DRAWINGS

FIG. 1 illustrates an example of configuration diagram of entire ship navigational system 1.
FIG. 2 illustrates an example of hardware configuration of management server 101.
FIG. 3 illustrates an example of hardware configuration of user terminal.
FIG. 4 illustrates an example of hardware configuration of land-based management terminal 103.
FIG. 5 illustrates an example of user management information 221 of master information management DB 220.
FIG. 6 illustrates an example of ship management information 222 of master information management DB 220.
FIG. 7 illustrates an example of map display screen 700 to be displayed on output device of user terminal.
FIG. 8 illustrates an example of ship information display screen 800.
FIG. 9 illustrates examples of voyage recording screens 900 and 950.
FIG. 10 illustrates examples of route plan setting and display screens 1000 and 1050.

FIG. 11 illustrates an example of general plot information display screen 1100.

FIG. 12 illustrates examples of general plot information setting screens 1200-1230.

FIG. 13 illustrates an example of fishery plot information display screen 1300.

FIG. 14 illustrates an example of fishery plot information setting screen 1400.

FIG. 15 illustrates examples of installation area selection screens 1500-1530 of fishery plot information.

FIG. 16 illustrates examples of weather information display screens 1600-1630.

FIG. 17 illustrates an example of radar mode display screen 1700.

FIG. 18 illustrates examples of radar mode caution and warning display screens 1800 and 1850.

FIG. 19 illustrates a diagram for explaining about judgment areas of caution and warning.

FIG. 20 illustrates a diagram for explaining about judgment of caution and warning.

FIG. 21 illustrates a diagram for explaining about judgment of caution and warning for a ship in port.

FIG. 22 illustrates a diagram for explaining about judgment of caution and warning for a plot area such as construction and the like.

FIG. 23 illustrates an example of map display screen 2300 to be displayed on output device of land-based management terminal 103.

FIG. 24 illustrates an example of navigation record screen 2400.

FIG. 25 illustrates an example of route plan setting and display screen 2500.

FIG. 26 illustrates examples of general plot information display screens 2600 and 2650.

FIG. 27 illustrates examples of fishery plot information display screens 2700 and 2750.

FIG. 28 illustrates example of user terminal navigation information 232.

FIG. 29 illustrates an example of the plot management information 241.

FIG. 30 illustrates an example of flow 3000 of storing navigation information 231 at management server 101.

FIG. 31 illustrates an example of flow 3100 of displaying navigation information 231 at user terminal.

FIG. 32 illustrates an example of flow 3200 of processing of another caution and warning for a collision.

FIG. 33 illustrates an example of another warning and warning processing flow 3300 of a collision.

FIG. 34 illustrates an example of virtual radio function display screen 3400.

FIG. 35 illustrates examples of virtual radio control panels 3500 and 3550.

FIG. 36 illustrates an example of virtual radio function display screen 3600.

FIG. 37 illustrates an example of flow 3700 of processing of virtual radio.

MODE FOR CARRYING OUT THE PRESENT INVENTION

Embodiments will be described below with reference to the drawings.

Heretofore, an electronic equipment used for ships is expensive, and an application, a permission, and a maintenance are required for disposing the electronic equipment in a ship. At the maintenance and repairing for maintaining the electronic equipment, the equipment needs to be handed over to specialists and a large cost may arise from that. Furthermore, a training or taking a course for acquiring its operation (a training which charges an admission fee) may be required.

Examples of the electronic equipment include a radar, a GPS (Global Positioning System) plotter, an AIS (Automatic Identification System: automated ship identification device), an anemometer, an international VHF (Very High Frequency: ultrashort wave) radio (wireless system) and the like. It is necessary to purchase each electronic equipment individually so that a unified operability for them is difficult to obtain.

In addition, the AIS needs to be installed on a ship or passenger vessel for international voyages and on a ship or vessel for non-international voyages with a gross tonnage of 500 tons or more. The AIS is an analog radio device which can transmit data in a wireless system. For example, an identification code of a ship that sails, a ship's name, a position of a ship and the like are included in the data. The AIS is convenient in that it can display received data on an electronic nautical chart or a radar screen. However, since the AIS is expensive and large, it is often not disposed on a small ship such as a pleasure boat and the like.

On the other hand, according to a ship navigational system (Ship Movement-Sharing Navigation Support System) 1 of the present embodiment, functions of main electronic equipment for conventional small ships are realized on a cloud using IoT and/or AI, and an information of all ships, a weather information, a surrounding information and the like are shared in real time via the Internet. By displaying the information on a tablet or smartphone, it becomes possible to solve problems that have been barriers for having the electronic equipment for individuals, such as the cost for introducing, maintaining, and updating the electronic equipment, the temporal cost for obtaining and applying the licenses thereof, the cost of learning for acquiring operations thereof, the training which charges an admission fee and the like. Therefore, it becomes possible to realize a safe and comfortable marine life by using the system 1.

1st Embodiment

According to the embodiment, an example of displaying an information of ships on a nautical chart on the user terminal will be described.

FIG. 1 illustrates an example of a configuration diagram of a ship navigational system 1 as a whole.

The ship navigational system 1 includes a plurality of user terminals 102 and a plurality of land-based management terminals 103, and each terminal is connected to the management server 101 via a network. This system is implemented by installing an appropriate application (application program) on a tablet or smartphone. Therefore, a mobile telephone communication (or a data communication based on a SIM (Subscriber Identity Module) card) is used as a network for being accessed from the user terminals which are used on ships at sea. It is possible to connect the user terminals to the Wi-Fi (registered trademark) in the ships so as to communicate with the management server 101 via the Wi-Fi. The onboard Wi-Fi may be connected to a land-based network by using satellites or the like.

The connection between the land-based management terminal 103 and the management server 101 may be performed by using a radio network (wireless network) or a wired network. Each terminal may transmit and receive the information over the network.

The user terminal 102 is, for example, a tablet, a smart phone or the like which is possible to be brought into and/or disposed on a small ship or the like. In this specification, the small ship may refer to a ship which is mainly called a pleasure boat for the purpose of leisure or sports such as a motorboat, a yacht or a water motorcycle which can be used by individual. The user terminal 102 is configured to transmit and receive data to and from the management server 101, the land-based management terminal 103, and other user terminals 102 based on, for example, the data communication by using the mobile telephone communication.

The land-based management terminal 103 is, for example, a device such as a personal computer or the like which can be disposed in a shipping company of owning small ships or commercial ships, or in a land-based company such as a construction company or a leisure company. The land-based company may provide services that use ships, and may perform an operation for managing ships by using the land-based management terminal 103 together with the service management.

The AIS system 104 has a mechanism in which an individual information (for example, an identification code, a ship's name, a position, a route, a ship speed, a destination and the like of the own ship) may be transmitted from the AIS device mounted on a ship based on wireless communication by using VHF radio waves, and the individual information may be received by other ships sailing or navigating in the vicinity of the own ship or a marine traffic center located on land.

Each terminal or the management server 101 used in the ship navigational system 1 is not limited to the above-mentioned examples. For example, the terminal or the server may be a portable terminal such as a smartphone, a tablet, a mobile phone or a portable telephone, or personal digital assistants (PDAs), or a wearable terminal such as an eye-glass type terminal, a wrist watch type terminal or a cloth type terminal. A stationary or portable computer, or a server located on a cloud or network may also be used for them. Furthermore, a combination of a plurality of terminals may be used for them. For example, a combination of one smartphone and one wearable terminal may logically function as one terminal. In addition, an information processing terminal other than these types may be used.

Each terminal and the management server 101 used in the ship navigational system 1 includes a processor for executing an operating system, an application, a program or the like; a main storage device (memory) such as a RAM (Random Access Memory); an auxiliary storage device such as an IC card, a hard disk drive, an SSD (Solid State Drive), a flash memory or the like; a communication control unit such as a network card, a radio (wireless) communication module, a mobile communication module or the like; an input device such as a touch panel, a keyboard, a mouse, a voice input, a motion detection device based on captured images of camera unit or the like; and an output device such as a monitor or a display. Note that the output device may be a device or a terminal for transmitting an information to be output to an external monitor, a display, a printer, a device, or the like.

Various programs and applications (modules) and the like are stored in the main memory, and each functional element of the entire system is realized when the processor executes these programs and applications. Note that each of these modules may be implemented by using a hardware on which the modules are integrated. Each module may be an independent program or application, but it may be implemented in a form of a single integrated program or some sub-programs or functions in the application.

In this specification, each module is described as a subject which may perform the processings, but in practice, a processor for processing various programs, applications (modules) and the like may be used to execute the processings.

Various databases (DB) are stored in the auxiliary storage device. In this specification, a "database" may be a functional element (storage unit) that stores a data set so as to accommodate any data manipulation (e.g., extraction, addition, deletion or overwriting of data) performed by a processor or an external computer. The method of implementing the database is not limited, and it may use, for example, a database management system, a spreadsheet software, or a text file such as XML.

FIG. 2 illustrates an example of a hardware configuration of the management server 101.

The management server 101 is configured, for example, by using a server which is arranged on a cloud.

The main storage device (memory) 201 stores programs and applications such as a map display module 211, a radar display module 212, a plot setting and display module 213, a route plan setting module 214, a weather information display module 215, a radio (wireless) module 216, a collision judgement module 217, and the like. When the processor 203 executes these programs and applications, the functional elements of the management server 101 are implemented.

The map display module 211 is configured to read a navigation information 231, such as an AIS information 233 and a user terminal navigation information 232 which are transmitted from each ship and stored in the auxiliary storage device 202. Then, the map display module 211 processes a necessary information, transmits the processed information to the user terminal 102 and/or the land-based management terminal 103 so as to display the ship information and other related information on the nautical chart.

The radar display module 212 is configured to read a navigation information 231, such as an AIS information 233 and a user terminal navigation information 232 which are transmitted from each ship and stored in the auxiliary storage device 202. The radar display module 212 is also configured to process a necessary information and transmit the processed information to the user terminal 102 and/or the land-based management terminal 103 so as to display the ships information and other related information in a display form of radar device.

The plot setting and display module 213 is configured to store a useful information, an obstacle information, a fishing implement installation area information and the like at an arbitrary position on the nautical chart to be used by the user. By tapping an arbitrary position on the nautical chart which is displayed on a tablet or smartphone and by inputting an information by the user, it becomes possible to store the information in the plot management information 241 and to display the information on other user terminals 102 using the ship navigational system 1 and/or on the land-based management terminals 103.

The route plan setting module 214 is configured to be used by the user or the land-based management terminal user to input the ship's navigation plan. By setting a destination and/or a transit point on the nautical chart, it becomes possible to display the route to the destination, the distance thereof, the required time thereof and the like thereon. The inputted information is stored in the route management information 242 and it becomes possible to perform the navigation according to the route management information 242.

The weather information display module 215 is configured to change or shape the weather management information 243 obtained from the Meteorological Agency or other weather-related organizations into a required shape for the ship and display it on the user terminal 102 and/or the land-based management terminal 103. Furthermore, the information on wind force, wind direction, wave force and the like may be used to calculate the time required for the navigation plan and to calculate a moving route (a predicted moving route) of the ship.

The radio module 216 is configured to provide a virtual radio function (wireless function) by implementing the functions of the international VHF wireless in terms of application by software means (virtually). By packetizing a voice information instead of the VHF radio waves and by transmitting and receiving it by using a data communication such as a mobile telephone network, it becomes possible to realize a call function or communication function on a smartphone or tablet as if by the VHF radio equipment. The setting information related to the virtual radio is stored in the radio management information 223.

When a ship in which the user terminal 102 having the ship navigational system 1 is used travels on a route where there is a possibility to collide with other ships or the like, the collision judgement module 217 displays a caution alert or warning alert on a screen of the management server 101, the user terminal 102 or the land-based management terminal 103. There may be many small ships which are not equipped with the AIS equipment on the sea. However, by installing the application of the ship navigational system 1 according to the present embodiment on the smartphones or tablets used in the ships in advance, the users of the ships are able to predict the possibility to collide with other ships or the like in terms of the cautio alert or warning alert. As a result, even in this case, it becomes possible to prevent a marine accident.

The navigation information storage module 218 is configured to store the user terminal navigation information 321 in the user terminal navigation information 232 of the navigation information management DB 230 collectively wherein the user terminal navigation information 321 includes the position information sequentially transmitted from a plurality of user terminals 102. In addition, the navigation information storage module 218 is configured to store the AIS information in the AIS information 233 of the navigation information management DB wherein the AIS information includes the position information of the AIS-equipped ships acquired from the AIS system 104.

A master information management DB 220, a navigation information management DB 230 and a support information management DB 240 are stored in the auxiliary storage device 202. The master information management DB 220 stores the user management information 221 for managing users, the ship management information 222 for managing ships, and the radio management information 223 for setting the virtual radio.

The navigation information management DB 230 stores the navigation information 231 including the user terminal navigation management information 232 received from the user terminals 102, and the AIS information 233 received from the large ships and the like.

The support information management DB 240 stores the plot management information 241 for storing the plot information, the route management information 242 for storing the route plan, and the weather management information 243 for storing the weather information.

The various modules may calculate the position, the navigation state and the like of the ships by analyzing and processing various types of information stored in the auxiliary storage device 202, and output and display the results on the respective terminals and/or output devices.

FIG. 3 illustrates an example of hardware configuration of the user terminal 102.

The user terminal 102 is configured by, for example, a tablet, a smart phone or the like.

The main storage device 301 stores programs and applications such as a map display module 311, a radar display module 312, a plot setting and display module 313, a route plan setting module 314, a weather information display module 315, a radio module 316, a collision judgement module 317 and the like. When the processor 303 executes these programs and applications, each functional element of the user terminal 102 is realized.

The map display module 311 is configured to process the navigation information 231 of other ships sent from the management server 101 and the information acquired from the own user terminal 102 or the own ship, and to display the ships and other related information on the nautical chart.

The radar display module 312 is configured to process the navigation information 231 of other ships sent from the management server 101 and the information acquired from the own user terminal 102 or the own ship, and to display the ships and other related information in the display form of the radar device.

The plot setting and display module 313 is configured to receive a selection of arbitrary position on the nautical chart from the user, and to store a useful information, an obstacle information, a fishing implement installation area information and the like.

The route plan setting module 314 is configured to accept an input of ship navigation plan from the user. By setting the destination and the transit point on the nautical chart, the route to the destination, the distance thereof, the required time thereof and the like are displayed. It is also possible to perform a navigation according to the inputted information.

It is possible to configure the plot setting and display module 313 and the route plan setting module 314 as a part of the map display module 311 and the radar display module 312. In this case, it may be possible to consider that the processing performed by the plot setting and display module 313 and the route plan setting module 314 is a processing performed by the map display module 311 and the radar display module 312.

The weather information display module 315 is configured to display the weather information obtained from the Meteorological Agency and other meteorological organizations sent from the management server 101.

The radio module 316 is configured to provide the virtual radio function. The voice information inputted to the user terminal 102 is packetized, and then transmitted and received by the data communication such as the mobile telephone network or the like. As a result, a call function is realized as if with a VHF radio device.

When a ship in which the user terminal 102 having the ship navigational system 1 is used proceeds on a route where there is a possibility to collide with other ships or the like, the collision judgement module 317 displays an alert notification of warning or caution instructed by the management server 101 on the screen. It is possible to perform the calculation of the possibility of collision by the collision judgement module of the user terminal 102 instead of the management server 101.

The GPS 306 is configured to acquire the position information of the user terminal 102 and temporarily store it in the user terminal navigation information 321. Also, the GPS 306 has an electronic compass therein so that it is possible to obtain the orientation. The user terminal navigation information 321 is periodically transmitted to the management server 101 so that the position information of the user terminal 102, that is, the position information of the ship on which the user terminal 102 is used, is transmitted to the management server 101.

The input device 304 includes a touch panel, an audio input, an input by motion detection based on captured images of the camera unit 307 or the like. Also, it is possible to configure the input device 304 as an external input device such as a keyboard, a mouse or a microphone. These input devices may be operated by using the radio communication (wireless system) such as Bluetooth (registered trademark) or the wired communication.

The output device 305 is configured as a display of a smartphone or tablet. However, it is possible to configure it as a device or terminal for transmitting the information to an external monitor, a display, a printer, a device or the like and for displaying the transmitted information thereon.

The camera unit 307 captures on-site photographs so as to be registered in the plot information, or captures photographs at the time of the user registration or the ship registration.

The auxiliary storage device 302 stores the user terminal navigation information management DB 320, and stores the position information of the user terminal 102 acquired from the GPS 306 of the user terminal 102 as the user terminal navigation management information 321. It is possible to store the information obtained from the radar, the GPS plotter, the AIS, the wind direction and anemometer, the international VHF radio or the like disposed on the ship combined with the above-mentioned information.

The various modules are configured to analyze and process the various types of information stored in the auxiliary storage device 302 so as to calculate the position, the navigation state and the like of the ship, and output and display them on the respective terminals and output devices.

FIG. 4 illustrates an example of hardware configuration of the land-based management terminal 103.

The land-based management terminal 103 is configured, for example, by using a desktop computer or a laptop computer.

The main storage device 401 stores programs and applications such as the management server cooperation module 410 and the work management module 411 and the like therein. When the processor 403 executes these programs and applications, the functional elements of the land-based management terminal 103 may be realized.

The management server cooperation module 410 is configured to log in to the management server 101, to process the navigation information 231 of the ship, the plot management information 241, the route management information 242, the weather management information 243 and the like sent from the management server 101, and to display the results on the screen.

In addition, it is possible to access to the management server 101 simply via a Web browser and to cooperate with the management server 101 so as to transmit, receive and display the information by using the functions of the Web browser, rather than the form of the application. The management server cooperation module 410 may be a Web browser itself, a script executable by the Web browser, or another application independent of the Web browser.

The work management module 411 may be an application which is used in the business of a shipping company that owns small ships or commercial ships, or of a land-based company such as a construction company, a leisure company or the like.

In addition, it is possible to access to a system in the cloud simply via a Web browser and cooperate therewith so as to transmit, receive, and display the information by using the functions of the Web browser, rather than the form of the application.

The ship navigational system 1 may cooperate with the work management module 411 of a land-based company.

The auxiliary storage device 402 stores a business management DB 420 for storing the work management information 421 therein.

FIG. 5 illustrates an example of the user management information 221 of the master information management DB 220.

The user management information 221 is a master information for managing the user of the ship navigational system 1.

A user profile ID 501, a photograph ID 502, a name (in native language) 503, a name (in English) 504, a telephone number 505, an E-mail address 506, an E-mail arrival confirmation 507, a created date and time 508, and an updated date and time 509 are stored therein, and therefore the data which can be used for specifying the user uniquely is stored therein.

When the ship is actually operated, the license information for the ship is also registered in association with the user profile ID 501. For a small ship license, an information such as a license number, a name, a date of birth, a registered domicile, an address, a type of license, an expiry date of license, a date of issuance of license, a date of registration of license, a photograph of license and the like are registered.

For a large-scale ship license, an information such as a license classification, a license number, a date of license, a name, a sex, a date of birth, an address, a registered domicile or nationality, a date of issuance of license, an expiration date of license, a photograph of license and the like are registered.

FIG. 6 illustrates an example of the ship management information 222 of the master information management DB 220.

The ship management information 222 is a master information for managing a ship which is required to be managed by the user of the ship navigational system 1.

The information includes a ship ID 601, a ship type ID 602, a ship type ID 603 of a ship specification, a ship's name (in native language) 604, a ship's name (in English) 605, a ship's name in Kana (in Japanese) 606, a registry of the ship 607, a ship port ID 608, a ship number 609, a ship ID number 610, a status 611, a ship IMO 612, a ship MMSI 613, a call sign 614, a ship size ID 615, a created date and time 616, and an updated date and time 617, and an information for uniquely identifying the ship is stored.

As for the type of ship, it is possible to register a tanker ship, a cargo ship, a tugboat, a passenger ship, a fishing ship, an enterprise ship, an application ship, a jet ski or the like.

The status indicates the current condition of the ship, and there may be "0: in port", "1: under operating" and "2: under maintenance".

FIGS. 7-10 are examples of display screens 700 that are to be outputted to an output device of the user terminal 102.

FIG. 7 illustrates an example of a map display screen 700 to be displayed on an output device of the user terminal 102.

Various types of information are arranged and displayed on the nautical chart. The part having a dark color indicates an area of sea 751 and the part having a bright color indicates an area of land 752. The map display module 311 is configured to display a nautical chart information 751, 752 stored in the user terminal 102, a menu panel 701, an azimuth and speed meter 706, a display section for name of operating ship 707, a radio button 711, a current position button 712, a search button 713, a display section for the current position 717 and the like based on the information stored in the application of the user terminal 102 in advance. The location information such as the ships 721, 731 and other icons 715, 716 and their contents and the navigation information 231 are sequentially received from the management server 101, processed by the map display module 311, and displayed on the nautical chart superimposingly as icons or the like.

Note that all of the information may be implemented by a client-side application in which the information is processed and displayed by the user terminal 102 based on the information stored in the user terminal 102. Conversely, all of the information may be implemented by a server-side application in which the information is processed by the management server 101 and the user terminal 102 is simply configured to display the information received from the management server 101.

The menu panel 701 is configured to display a plot information display button 702, a route plan display button 703, a weather information display button 704, and a radar mode display button 705. This menu panel 701 is mostly displayed on the screen even if the screen is changed among several forms. By tapping these buttons, the screen may be changed among the display of the plot information, the display of the route plan, the display of the weather information, and the display of the radar mode.

The azimuth and speed meter 706 displays the traveling azimuth angle (moving direction) and moving speed of the ship on which the user terminal 102 is disposed. The moving direction and the moving speed are calculated and displayed based on the temporal transition of the position information acquired by the GPS 306 which is mounted on the user terminal 102. In addition, it is possible to display values taken from the external GPS, the compass, or the speedometer.

The display section for name of operating ship 707 is an area for displaying the name of the own ship, which is the operation target registered by the user.

The radio button 711 indicates a reception of virtual radio. When the virtual radio is received, the light is turned on in orange color. If this button is tapped, it is changed to the virtual radio function.

If the current position button 712 is tapped, a current position 717 is displayed on the nautical chart.

If the search button 713 is tapped, it becomes possible to display a search screen for searching the ship.

The display section for the number-of-ships 714 displays the number of ships displayed in the screen and the total number of received data in the form of the number of ships displayed in the screen or the total number of received data.

The display section for the rent radio location 715 displays the location of the radio devices that are rent. The green colored icon is displayed if the radio is turned on, and the red colored icon is displayed if the radio is turned off.

The display section for the location of a rental company 716 displays the location of the company that rents the radio.

The display section for the current position 717 indicates the position of the own ship.

The scale 718 displays the scale of the nautical chart. It is possible to enlarge or reduce the size of the nautical chart.

The obstacle 723 is an icon for indicating an obstacle on the sea.

According to the ship navigational system 1, it is possible to display the information of the user terminal-equipped ships and the AIS-equipped ships together on the nautical chart.

The ships 721, 731 are icons for displaying the positions of the ships equipped with the user terminal 102 at sea. The location information or the like acquired by the GPS 306 of the user terminal 102 disposed on each ship is stored in the management server 101 as the user terminal navigation information 232. The information is processed and transmitted from the management server 101 to the user terminal 102 as the processed navigation information 231 including the ship type information and the ship position information of each ship. In a case where the user terminal 102 receives the navigation information 231, the user terminal 102 displays the icon corresponding to the ship type of each ship at the ship position designated by the position information of each ship.

The AIS-equipped ships 741 are displayed as icons which indicate positions of relatively large ships such as an international ship, a passenger ship or other large ship or vessel equipped with the AIS device. The AIS information including the position information and the like transmitted from the AIS device of each ship via the VHF radio is acquired via the AIS system. The information is accumulated in the management server 101 as the AIS information 233 and the AIS information is processed and then transmitted from the management server 101 to the user terminal 102 as the processed navigation information 231 including the ship type information and the position information of each ship. In a case where the user terminal 102 receives the navigation information 231, the user terminal 102 displays the icon corresponding to the ship type of each AIS-equipped ship at a position designated by the position information of each AIS-equipped ship. In this case, it is possible to display the icons having corresponding longitudinal and lateral sizes of the ships on the nautical chart based on the information of the length and width of the hull (body) of the ship.

It is possible to select the ship type and display the ship based on the selection. For example, it is possible to select the ship type from a tanker ship, a cargo ship, a tugboat, a passenger ship, a fishing ship, an own ship, an application ship, a water motorcycle and the like. It is also possible to select displaying or hiding the ships on the screen.

For the ship which proceeds at a predetermined speed or more (e.g., 2 knots or more) (cf. 721, 731, etc.), it is possible to light up the starboard light (in green color) and the port light (in red color). For a stopped ship (or a ship in port) or a ship moving at low speed (e.g., slower than 2 knots) (cf. 722, etc.), it is possible not to light up the starboard light and the port light.

According to the display system of the conventional AIS system 104, there is a case that the velocity vector of the ship is displayed at all times. In a case that the speed vector is long, it is possible to understand that the ship is moving. On the other hand, in a case that the speed vector is not displayed, it is possible to understand that the ship is stopped. However, in a case that all of the speed vectors are displayed for all ships on a smartphone or tablet having a small screen as in the ship navigational system 1, the user interface thereof tends to become very difficult to understand on the small screen.

Therefore, according to the ship navigational system 1, the predicted moving routes or the tracks for all ships are not always displayed on the basic screen. Only a specific ship is selected by tapping or the like, the predicted moving routes or the tracks thereof are allowed to be displayed. For other ships, the starboard side light and/or the port side light may be lighted up to indicate that the other ships are moving not without displaying the predicted moving routes.

When the ship 731 displayed on the screen is selected by tapping or the like, it becomes possible to display the ship information 732 such as the name of the ship, the speed of the ship, the distance from the own ship, the past track 733 of the ship, and the predicted moving route 734 of the ship to the predicted arriving position after a predetermined time (e.g., five minutes) in near future.

According to the conventional AIS display system, the velocity vector is displayed as a straight line based on the moving speed and the moving direction of the ship (course over the ground or heading) of the ship. In reality, however, the ships do not proceed on a straight line due to the influence of winds and waves.

According to the ship navigational system 1 of the present embodiment, in order to calculate a more accurate predicted moving route, the map display module 211 of the management server 101 is configured to calculate a predicted arriving position and a predicted moving route in near future after a predetermined period of time by using not only the moving speed and the course information of a certain point but also the navigation information 231 accumulated in past, and by using the moving route information of the ship from past to present.

For example, it is possible to calculate the predicted arriving position and the predicted moving route after 5 minutes based on the navigation information 231 up to 5 minutes before. Position information for five points of every minute from the present to five minutes before are acquired. Then an approximate quadratic curve of these points is obtained as a future predicted moving route based on the coordinates of five points by using the latitudes as the Y-axis and the longitudes as the X-axis. In addition, it is possible to calculate the predicted arriving position after 5 minutes by obtaining the predicted moving distance after 5 minutes based on the speed information or the moving distance information and by adjusting it to the predicted moving route.

According to the above-mentioned example, the calculation is made based on the position information. It is also possible to calculate a future velocity vector by using changes of velocity vector from 5 minutes before until the present so as to obtain a predicted arriving position and a predicted moving route after 5 minutes.

By calculating the deviation between the heading direction obtained from the electronic compass of the GPS 306 in the user terminal 102 and the heading direction in the moving direction determined from the navigation route of the last few minutes, it is possible to detect the turn (Rate of turn) and to calculate the head-turning rate. It is also possible to calculate the predicted moving route based on the moving direction (azimuth velocity vector) and the calculated head-turning rate.

Note that it is possible to display the predicted moving route more accurately by using a curved line based on the calculation as described above. However, it is also possible to display the speed vector linearly based on the moving speed and the course (course over the ground or heading) of the ship in the ship navigational system 1 of the present embodiment.

FIG. 8 illustrates an example of a ship information display screen 800.

When the selected ship 731 or the ship information 732 displayed on the screen is further selected by tapping or the like, the map display module 311 displays the ship information display screen 800 for the selected ship.

The image of the ship uploaded by the user or the ship management company is displayed in the ship image 801.

The detailed information 802 on the ship displays the management information of the ship stored in the ship management information 222 of the management server 101, and the navigation information such as the speed and the course at the present time and at a predetermined time based on the navigation information 231.

FIG. 9 illustrates examples of the voyage recording screens 900 and 950.

The map display module 311 of the user terminal 102 is configured to display the navigation (voyage) record list 950 by acquiring the navigation record information 2800 illustrated in FIG. 28 which is stored in the user terminal navigation information 232, from the management server 101. In the navigation record list 950, the date and time 902 of the voyage, the distance of voyage 903, and the operating time 904 of the past voyage information 901 are displayed. When the selection of one of these items 905 is accepted, the navigation record information 900 is displayed by acquiring the ship position information 2820 illustrated in FIG. 28 which is stored in the user terminal navigation information 232, from the management server 101.

The route 912 of the selected ship 911 is displayed in the voyage record information 900. It is possible to display the position of the ship at a predetermined time 914 by operating the slider bar (seek bar) 913.

FIG. 10 illustrates examples of route plan setting and display screens 1000 and 1050.

When the route plan display button 1001 is tapped, the route plan setting module 314 of the user terminal 102 displays the nautical chart information stored in the user terminal 102, a measurement menu display button 1002, a back button 1003, a forward button 1004, a line deletion button 1005, and the like based on the information stored in the application of the user terminal 102 in advance. Ships and other icons are displayed as icons and the like layered on the nautical chart as with the map display module 311.

The measurement menu display button 1002 is configured to display a menu for selecting an item to be displayed at the point 1012 or 1013 as a route plan or for inputting a speed setting at the time of the measurement.

It is possible to add a point to be routed by tapping a predetermined position on the nautical chart by the user. In this example, it is illustrated that a starting point 1011 is selected, and then a first point 1012 and a second point 1013 are selected.

In a case that the point selection fails, it is possible to return to a former state by tapping the back button 1003. Also, it is possible to proceed to a previous state (next state) by tapping the forward button 1004. Furthermore, it is possible to delete the selected route to refresh it by tapping the line deletion button 1005.

In the distance display screen 1000, it is possible to display the point information 1021, 1022 at each point. For example, the distances from the starting point 1011 to each of the points 1012 and 1013 are displayed in the point information 1021 and 1022.

It is also possible to select other display contents by using a menu which is displayed after tapping of the measurement menu display button, and to display the information such as a distance between the points, a required time, a scheduled arrival date and time, a course, a latitude and a longitude on the point information 1021 and 1022 and the like.

The registered route plan is stored in the route management information 242 of the support information management DB 240 of the management server 101. It is possible to store it in the navigation information management DB 320 of the user terminal 102 as well. It is also possible to use the route plans as a navigating 1050. At the own ship representation 1031, the current position on the route is displayed. The time required from this current position to the next point 1032 is displayed in the point information 1041. Also, the time required for the final destination 2032 is displayed in the point information 1042.

The required time is calculated based on the speed setting (e.g., an initial value of 10 knots) and the distance at the measurement which are input by the menu. In the navigation mode, it is possible to recalculate it based on the current speed in the course of moving so as to display a more accurate time.

FIG. 11 illustrate an example of a general plot information display screen 1100.

The plot setting and display module 313 of the user terminal 102 acquires and processes the plot information stored in the plot management information 241 of the support information management DB 240 of the management server 101 so as to display the plot information 1101, 1102 and the like on the nautical chart. The plot management information 241 stores a plot information 2920, a plot details information 2920, and a plot position information 2940 as shown in FIG. 29.

When the specific plot information 1101 is selected by tapping or the like, the details 1103 of the plot information are displayed.

FIG. 12 illustrates examples of general plot information setting screens 1200, 1210, 1220 and 1230.

When the user selects a predetermined position on the nautical chart by tapping or the like, the plot setting and display module 313 displays a category selection screen 1200 for adding a plot information. It is possible to select a category information such as a useful information, an obstacle, a warning, a map problem, a fishing equipment installation area and the like. For example, in a case that the useful information 1201 is selected, the plot selection and display module displays a subcategory selection screen 1210.

For example, when the user selects the leisure spot (area for leisure) 1211, the plot selection and display module displays the plot information input screen 1220 so as to accept an input of information for the title 1221, the comment 1222, and the image 1223. In the image 1223, the captured images or the selected images are displayed by the capturing image 1224 and the selecting image 1225.

Then, the preview screen 1230 is displayed, and when the completion button 1231 is tapped, the plot selection and display module sends the plot information and the selected location information to the management server 101. The management server 101 stores the sent information together with the position information in the plot management information 241.

FIG. 13 illustrates an example of a fishery plot information display screen 1300.

The plot setting and display module 313 of the user terminal 102 acquires and processes the plot information stored in the plot management information 241 of the support information management DB 240 of the management server 101 so as to display the plot information for fishery 1301 and the like on the nautical chart. As a main difference from the general plot information, the above-mentioned plot is displayed as an area composed of a plurality of pieces of position information instead of one piece of position information.

When the plot information 1301 is selected by tapping or the like, the details 1302 of the plot information are displayed.

FIG. 14 illustrates examples of the fishery plot information setting screens 1410 and 1420.

When a predetermined position on the nautical chart is selected by tapping or the like by the user, the plot setting and display module 313 displays a category selection screen 1200 for adding a plot information as illustrated in FIG. 12. When the fishing implement installation area 1202 is selected, the plot selection and display module displays an input screen 1410 for the fishing implement installation information so as to accept an input of information for the name of the fishing implement 1401, the contact information 1402 such as the name of the installer and the contact information and the like, the installation period 1403, the comment 1404, and the image 1405.

Then, the preview screen 1420 is displayed. If the completion button 1421 is tapped, the plot selection and display module displays the installation area selection screen 1500.

FIG. 15 illustrates an example of the installation area selection screens 1500, 1510, 1520 and 1530 of the fishery plot information.

The area is set by tapping and dragging the nautical chart by the user 1501 (screen 1500). The plot selection and display module 313 terminates the drawing if the start point and the end point of the line being drawn are connected to each other, and sets the area 1511 surrounded by the line as a plot area (installation area) (screen 1510). By pressing on the line (long pressing), the anchor point 1522 is displayed and it becomes possible to edit the area 1521 (screen 1520). It is also possible to change the position on the nautical chart by dragging the anchor point 1522.

When the plot area is determined, the confirmation display 1531 is displayed, and the setting of the fishery plot is finished (screen 1530). The plot selection and display module sends the plot information and the selected plot area information (a set of a plurality of pieces of position information) to the management server 101. The management server 101 stores the sent information together with the position information in the plot management information 241.

FIG. 16 illustrates examples of weather information display screens 1600, 1610, 1620 and 1630.

By tapping the weather information display button 1601, the weather information display module 315 of the user terminal 102 displays the map and nautical chart information stored in the user terminal 102, the menu display button 1605, the radio (wireless) button 1602, the current location button 1603, and the search button 1604, and also displays the weather management information 243 sent from the management server 101 layered on the map and nautical chart. It is possible to send the map and nautical chart information together with the above-mentioned information from the management server 101. It is also possible to acquire the weather information from another weather server instead of the management server.

By tapping the menu button, it becomes possible to choose the display screen from among the wind information display 1610, the wave information display 1620, and the wind and wave information display 1630.

By tapping on the map or by searching the position, the wind information 1611, the wave information 1621, or the wind and wave information 1631 at the point is displayed.

FIG. 17 illustrates an example of a radar mode display screen 1700.

In general, the radar equipment is configured to measure a distance to an object by emitting radio waves by itself and catching the reflected wave, and to display the object on the radar. According to the present embodiment, it is possible to provide a representation similar to that of the expensive radar equipment by using the user terminal.

In the radar mode display of the ship navigational system 1, the radar display module 312 of the user terminal 102 draws icons of the ships and the like at positions of the ships, obstacles and the like on the radar mode display based on the navigation information 231 which is sent from the management server 101.

The radar display module 312 is configured to display the own ship 1701 at the center of the screen. In other words, when the ship moves, the position of the own ship 1701 does not change (it is fixedly displayed), and the nautical chart will move in the opposite direction to the moving direction of the own ship.

The velocity vector 1702 of the own ship indicates the moving speed of the own ship. The radar display module 312 displays the arrow by changing the length of the arrow corresponding to the changes of the moving speeds. The leading edge of the arrow indicates the predicted arriving position of the own ship after a predetermined period of time (e.g., 5 minutes).

The moving direction 1703 indicates the moving direction of the own ship by a straight line.

The concentric circles 1704 around the own ship indicate the distance from the own ship and the distances between the adjacent concentric circles is displayed in the interval section 1706. Also, the scale of the nautical chart is displayed in the scale section 1705.

The radio button 1707 indicates a receiving condition of the virtual radio. When the virtual radio is received, the light is turned on in orange color, and when this button is tapped, the screen is changed to the virtual radio function mode.

The radar display module 312 is configured to display icons 1711 and 1712 of the other ships at the positions based on the navigation information 231 of the other ships received from the management server 101.

The radar display module 312 is configured to calculate and display the predicted arriving positions and the predicted moving routes 1713 after a predetermined time (e.g., five minutes) of the other ships when the other ships enter within an area encircled by the outer circle. It is possible to explain that this calculation is performed by the radar display module 312 of the user terminal 102. However, it is also possible to perform the calculation by the radar display module 212 of the management server 101 so as to transmit the position information and the curve information to the user terminal 102. Then, the user terminal 102 may draw the information on the screen.

It is possible to display not only the user terminal-equipped ships 1711 and 1712 but also the information about the AIS device-equipped ships 1714 and 1715 in the radar display screen 1700 similar to the map display screen 700.

FIG. 18 illustrates examples of caution and warning display screens 1800 and 1850 in the radar mode.

The caution screen 1800 and the warning screen 1850 are displayed according to the approaching condition of the other ships.

The radar display module 312 is configured to display a notification of caution 1801 in yellow when it is determined that the predicted moving route 1812 of the other ship 1811 and the moving direction 1813 of the own ship 1814 cross with each other. Velocity vector 1812 of the other ship 1811 and the other ship are displayed by changing the color to yellow. The speed vector 1823 of the own ship 1814 is also displayed by changing the color to yellow.

The radar display module 312 is configured to calculate the time 1821 until the predicted moving route 1812 of the other ships and the moving direction 1813 of the own ship cross with each other, and to display the predicted arriving position 1822 of the own ship on the speed vector 1823 at the time to be displayed.

Furthermore, the radar display module 312 is configured to display a notification of warning 1851 in red when it is determined that the predicted moving route 1862 of the other ship 1861 and the moving direction of the own ship cross with each other within three minutes. In this case, the velocity vector 1862 of the other ship 1861 and the other ship are displayed by changing the color to red. In addition, a warning 1864 by using an animation of red colored concentric circles is displayed around the other ship 1861. Also, the velocity vector 1873 of the own ship is displayed by changing the color to red.

The radar display module 312 is configured to calculate a time 1871 until the predicted moving route 1862 of the other ship 1861 and the moving direction of the own ship cross with each other, and displays the predicted arriving position 1872 of the own ship on the speed vector 1873 at the time to be displayed.

By tapping the ship icons 1712 and 1815, the detailed information of the ships are displayed in the same manner as described in the map display, and the name, the speed, the distance from the own ship, the speed vector, the track and the like are displayed.

FIGS. 19 to 22 illustrate another method for judging the caution and warning.

FIG. 19 illustrates a diagram for explaining a determination area of caution/warning.

It is used to determine whether there is a possibility of collision between the own ship and the other ship (or between other ships).

The warning area 1912 is illustrated as a fan-shaped area having a radius 1911 and a center angle 1913. Also, the caution area 1902 is illustrated as a fan-shaped area having a radius 1901 and a center angle 1903.

The warning area 1912, illustrated in a dark color, is an area which is determined based on a potential area of outsailing ships according to the Prevention of Collision at Sea Act. The arrow 1911 is directed in the moving direction, and the tip of the arrow 1911 indicates, for example, the predicted arriving position after 3 minutes, and the length of the arrow 1911 indicates the moving distance from the current position to the predicted arriving position after 3 minutes. The center angle 1913 is based on the angle of the outsailing ship and it is an angle of 22.5 degrees from just beside of the ship to its back. That is, the center angle is 225 degrees with angles of 112.5 degrees to the left and right from the moving direction.

Therefore, the warning area 1912 is a fan-shaped area having angles of 112.5 degrees to the left and right from the predicted straight-line arrival distance after 3 minutes.

The caution area 1902, illustrated in light color, is an area which is determined based on a potential area of ships passing each other according to the Prevention of Collision at Sea Act. The arrow 1901 is directed in the moving direction of the ship, the tip of the arrow 1901 indicates, for example, the predicted arriving position after 5 minutes, and the length of the arrow 1901 indicates the moving distance from the current position to the predicted arriving position after 5 minutes. The center angle 1913 is effective if it is a range of about 10 to 30 degrees based on past marine accident trial cases. In this system, each angle is selected as 5 degrees to the left and right from the moving direction.

Therefore, the caution area 1902 is selected as a fan-shaped area having the angle of 5 degrees to the right and left from the predicted straight line arrival distance after 5 minutes.

In a case that the caution area 1902 and the warning area 1912 overlap with each other, the warning area takes priority over the caution area for the overlapped area (area having a radius 1911 and a center angle 1903), and the area is considered to be the warning area.

It is clear that the predicted arrival distance 1901 of the caution area 1902 is longer than the predicted arrival distance 1911 of the warning area 1912, and the center angle 1903 of the caution area 1902 is narrower than the center angle 1913 of the warning area 1912.

According to the ship navigational system 1, the notification of caution or the notification of warning is displayed depending on whether the caution area 1902 and the warning area 1912 of the ships overlap with each other or not.

In this example, the azimuth speed vector is used for the actual moving direction of the ship for the moving direction of the arrows 1901 and 1911. However, it is possible to use a bow direction vector as the direction of the bow instead. Also, it is possible to set the fan-shape of the caution area to have 5 degrees to the left and right from the azimuth velocity vector of the ship, and to set the arrow 1901 to be the bow direction vector. In this case, the caution area indicates a possible area of the actual progress of the ship based on the estimation obtained from the past movement from the GPS or the like, while the direction in which the ship is currently facing is represented by the arrow 1901. Similarly, for the warning area, the representation of the warning area may be displayed by using the azimuth velocity vector, and the arrow 1911 may be displayed by using the bow direction vector.

Also, in the radar mode illustrated in FIG. 18 or in the map mode illustrated in FIG. 7, it is possible to display the caution area and the warning area as illustrated in FIG. 19.

It should be noted that although the narrow fan-shape 1902 is used as the caution area and the wide fan-shape 1912 is used as the warning area, conversely, the narrow fan-shape 1902 may be used as the warning area and the wide fan-shape 1912 may be used as the caution area.

FIG. 20 illustrates diagrams for explaining the determination of the notification of caution/warning.

(a) is a case where the notification of caution is displayed.

The notification of caution is displayed by the radar display module 312 and the map display module 311 when only the caution areas 2001 and 2002 of each ship overlap with each other.

(b) is a case where the notification of caution is displayed.

The notification of caution is displayed by the radar display module 312 and the map display module 311 when the caution area 2003 of the first ship and the warning area 2004 of the second ship overlap with each other.

(c) is a case where the notification of warning is displayed.

The notification of warning is displayed by the radar display module 312 and the map display module 311 when the warning areas 2005 and 2006 of each ship overlap with each other.

Note that the importance level and the emergency level of the notification of warning are higher than those of the notification of caution.

For example, the notification of caution is displayed in a conspicuous color such as yellow in an area 1801 of FIG. 18. On the other hand, the notification of warning is displayed in a conspicuous color such as red in an area 1851 in FIG. 18.

In addition, it is also possible not to display the notifications of caution and warning in a certain case where the possibility of collision is determined as low based on the determination of overlapping of the areas as illustrated in FIG. 20. For example, when two ships are proceeding in the same direction (the rightmost case of (C)), the notifications of caution and warning are not displayed even if these areas overlap with each other. Also, the notifications of caution and warning are not displayed in a case where the speed of the preceding ship is higher than that of the following ship and the both of them proceed in the same direction. The alteration is possible. For example, the notifications of caution and warning may not be displayed in a case that the forward ship is stopped (at a port or the like). Even if the notifications of caution and warning are not displayed in this way, it is possible to display only the information of the other ship entering the caution/warning area. Also, it is possible to display the caution area or warning area in which the other ship entering on the nautical chart. Also, it is possible to change the color of the other ship in these cases. The alteration is possible.

Suppose that the warning area has the narrow fan-shape 1902 and the caution area has the wide fan-shape 1912, then in the case of (a), the notification of warning is displayed because the warning areas overlap with each other. Also, in the case of (b), the notification of caution is displayed because the warning area and the caution area overlap with each other. Furthermore, in the case of (c), the notification of caution is displayed because the caution areas overlap with each other.

FIG. 21 illustrates diagrams for explaining the determination of the notification of caution/warning for a ship at a stop.

(a) Suppose that one of the ships is at a stop or proceeds at low speed (e.g., 0.3 knots or less). Then, the notification of caution is displayed for both ships when the caution area 2102 of the other ship overlap within a predetermined area 2101 (e.g., 300 m) from the stopping ship.

(b) In a case that the warning areas 2104 of the other ship overlap within the predetermined area 2103 from the stopping ship, the notification of warning is displayed for both ships.

FIG. 22 illustrates a diagram for explaining the determination of caution and warning for a plot area such as a construction area and the like.

In a case that a construction area 2201 is set as a plot area by similar processings as the fishery plot, the radar display module 312 and the map display module 311 are able to estimate the plot area of the construction area by acquiring the plot management information 241 from the management server 101. The radar display module 312 and the map display module 311 display the notification of caution for the ship 2212 which is trying to enter in the area and the warning ships 2202 and 2203 which are warning of the area when the caution area 2211 of the ship overlaps within the construction area 2201. For example, as for the area 1801 of FIG. 18, it is possible to display a prominent color such as yellow with a message of "It is going to enter the construction area after 4:02".

In a case that the warning area 2221 of the ship overlaps within the construction area 2201, the notification of warning is displayed to the ship 2222 which is trying to enter in the area and the warning ship 2202 or 2203 which are warning of the area. For example, as for the area 1851 in FIG. 18, it is possible to display a prominent color such as red with a message of "It is going to enter the construction area after 1:08".

It is also possible to display the notifications of caution and warning not only to the warning ships 2202 and 2203 and the own ships 2212 and 2222, but also to the ship 2232 which is within a predetermined area (e.g., 300 m or less) from the construction area.

According to the ship navigational system 1, it is possible to display both of the user terminal-equipped ships and the AIS device-equipped ships together on the map display and the radar mode display. Also, it is possible to perform the collision determination by acquiring the AIS information 233 and the user terminal navigation information 232 for both of the ships equipped with the user terminal without the AIS and the ships equipped with the AIS so as to display the notifications of caution and warning to the user terminal.

Furthermore, it is possible to send the message and the notifications of caution and warning and display on the AIS by cooperating with the AIS system 104 to the AIS device-equipped ships by using the VHS radio.

FIGS. 23 to 27 illustrate examples of display screens to be output on the output device of the land-based management terminal 103 or the like.

The outputting the screens may be implemented by the client-side processing which performs most of the processing on the client side. Conversely, it may be implemented by the server-side processing which performs most of the processing on the server side and the land-based management terminal 103 is simply configured to receives and displays the images.

FIG. 23 illustrates an example of a map display screen 2300 to be displayed on the output device of the land-based management terminal 103.

The management server cooperation module 410 of the land-based management terminal 103 displays respective ships on the nautical chart. Usually, the land management terminal 103 is used by a certain land-based company so as to manage the information of a plurality of ships which are managed by the land-based company collectively.

In the ship list 2301, a list of ships which are currently managed by the land-based company is displayed. When one of the ships is selected, the information of the selected ship disappears from the list and a detailed information is displayed in the ship detail display area 2310 on the right side of the screen instead. The image 2312 of the ship and the detailed information 2311 are displayed in the ship detail display area 2310. The information may be acquired from the ship management information 222 and the navigation information 231 of the management server 101 and displayed on the screen.

The selected ship 2321, the past track 2322 of the ship, and the predicted moving route 2323 to the predicted arriving position after a predetermined time in future (for example, five minutes) are displayed on the nautical chart.

FIG. 24 illustrates an example of a navigation record screen 2400.

The management server cooperation module 410 of the land-based management terminal 103 is configured to display the voyage record information of each ship on the voyage nautical chart of the ship displayed in the ship list 2401.

When the selection of one of the ships in the ship list 2401 is accepted, the past track of the selected ship 2402 is displayed. It is possible to display the position of the ship at a predetermined time by operating the slider bar 2403. Also, it is possible to play back the navigation record information at double speed, quadruple speed, eighth speed or the like by operating the playback button 2404.

FIG. 25 illustrates an example of a route plan setting and display screen 2500.

It is possible to set the route plan at the land-based management terminal 103 similarly to the case of the user terminal 102.

When the display content is selected from the measurement tool menu 2501, the management server cooperation module 410 displays the information 2504 corresponding to the points of the respective routes 2502 and 2503. For example, in the example of the screen 2500, distances from the starting point to each point are displayed.

In the case of the land-based management terminal 103, it is possible to increase a management efficiency and a productivity by setting and managing the routes of a plurality of ships which are managed by the land-based company.

FIG. 26 illustrates examples of the general plot information display screens 2600 and 2650.

A plurality of plots 2601 and 2602 are displayed. When one of them is selected, the detailed information 2651 is displayed, and it becomes possible to set and edit the information.

Similar to the user terminal 102, it is possible to register a new plot information. For the case of the land-based management terminal 103, it is possible to increase the management efficiency and productivity by plotting and managing the information of a plurality of works and the like which are managed by the land-based company.

FIG. 27 illustrates examples of fishery plot information display screens 2700 and 2750.

Similar to the user terminal 102, it is possible to register a new plot area information 2701, and set and edit the detailed information 2751. For the case of the land-based management terminal 103, it is possible to increase the management efficiency and productivity by plotting and managing a plurality of fishing implement installation information and the like which are managed by the land-based company.

FIG. 28 illustrates examples of the user terminal navigation information 232.

The management server 101 integrates the user terminal navigation information 321 transmitted from a plurality of user terminals 102 and stores them in the user terminal navigation information 232 of the management server 101.

The user terminal navigation information 232 includes a navigation record information 2800 and a ship position information 2820.

The navigation record information records a history of the navigations of the ships registered in the user terminal 102. A navigation record ID 2801, a user ID 2802, a ship ID 2803, a corporate ID 2804, a project ID 2805, a status 2806, a starting time of operating a ship 2807, an ending time of operating a ship 2808, a purpose of operating a ship 2809, a total operating distance 2810, a maximum operating speed 2811, a created date and time 2812, an updated date and time 2813 and the like are stored in the navigation record information.

In the operation history ID 2801, unique IDs are automatically assigned to each of the navigation records, and the IDs become a key information to be referred from the ship position information 2820. The user ID 2802 is an ID allocated to each user terminal 102 and corresponds to an information for identifying the user terminal 102. It refers to the user profile ID 501 of the user management information 221. The ship ID 2803 is an ID for specifying a ship on which the user terminal 102 is used. It refers to the ship ID 601 of the ship management information 222. The status 2806 may indicate that "0: in port", "1: under operating", and "2: under maintenance".

The ship position information 2820 stores the moving track in each navigation record at every second, and stores a ship position ID 2821, a ship operation history ID 2822, a latitude 2823, a longitude 2824, a direction 2825, a distance (meter) 2826, a speed (kilometer per hour) 2827, a created date and time 2828, an updated date and time 2829 and the like. By transmitting the position information acquired by the GPS 306 of each user terminals 102 mounted on a plurality of ships to the management server 101 by using the respective user terminals 102, it becomes possible to store the ship position information 2820 for each user terminal 102.

The operating position ID 2822 is the ID which is automatically issued in the sequence. The operation history ID 2822 refers to the operation history ID 2801 of the operation record information 2800, and specifies the corresponding ship position information from the operation record.

Each column is generated and stored so as to be specified by the created date and time 2828 at every second, and store the latitude, the longitude, the direction of the ship, the moving distance from the previous stored point, and the speed at the point of time.

By acquiring the user terminal navigation information 232, it becomes possible to confirm the time and the position of the ship in a chronological order.

According to the AIS information 233 used in the AIS system 104 utilizing the VHF radio, it is possible to acquire a position information, a world standard time information, a course to ground, a speed to ground, a heading direction, a navigational condition, and a head-turning rate as dynamic information. Also, it is possible to acquire an IMO number, a calling code and a ship's name, a length and a width of ship, a type of ship, and a position of positioning antenna as static information. Furthermore, it is possible to acquire an information on a draft of ship, a dangerous cargo (type), a destination, a scheduled arrival time, and an information for safety of navigation as navigational information. It is possible to store the AIS information 233 in the navigation information management DB 230 of the management server 101 and display on the screen.

By using the position information and the like of the AIS information 233, it is possible to display the positions of ships relating to a large-sized ship and a large passenger ship on the nautical chart.

FIG. 29 illustrates examples of the plot management information 241.

The plot management information 241 includes a plot information 2900, a plot details information 2920, and a plot position information 2940. The plot information 2900 stores a basic information of a created plot, and includes a plot ID 2901, an account ID 2902, a plot category ID 2903, a title 2904, a plot type flag 2905, a plot detail ID 2906, a created date and time 2907, and an updated date and time 2908.

The plot ID 2901 is a sequential ID which is generated automatically at each time a plot is created. The title 2904 indicates a summary of the plot. The plot detail ID 2906 refers to the plot detail ID 2921 of the plot details information 2920.

The type of plot is registered in the plot category ID 2903. For example, as an upper-order category, it is possible to set a construction area, a restricted navigation area, a sign, a useful information, an obstacle, a caution, an urgent, a map problem, a fishing equipment installation area and the like. Also, as a lower-order category, it is possible to set a refueling station, a marina, a sign, a leisure spot and the like for the useful information. Similarly, it is possible to set a part, a floating object, a shallow, a net and the like for the obstacles. Also, it is possible to set a wave caution, a control boat, a construction area, a dangerous area and the like for the caution. Also, it is possible to set a rescue area, an accident and the like for the urgent.

The plot details information 2920 stores a detailed information relating to the plot, and includes a plot details ID 2921, a photograph ID 2922, a business name 2923, a contact address 2924, a start date of work 2925, an end date of work 2926, a comment 2927, a created date and time 2928, and an updated date and time 2929. When the user registers the plot information, the details information is stored in the plot details information 2920. IDs for specifying photographs to be registered as plot information are stored in the photograph ID 2922. Comments registered by the user are stored in the comment 2927.

The plot position information 2940 stores the position information of respective plots, and includes a plot point ID 2941, a plot ID 2942, a latitude 2943, a longitude 2944, an order 2945, a created date and time 2946, and an updated information 2947.

The plot point ID 2941 is a sequential ID generated automatically at each plot position. The plot ID 2942 refers to the plot ID 2901 of plot information 2900. In a case that an area is registered as a plot area rather than a point, such as a fishery plot, an information indicating a plurality of plot positions will be generated for one plot ID 2942, and an area surrounded by a plurality of plot positions will become a plot area. The order 2945 indicates the sequential order of the information indicating a plurality of plot positions for the plot area.

The user terminal 102 and the land-based management terminal 103 register the plot information by recording the information as the plot management information 241 at the time of plot setting. Thus, other users are able to display the plot information on the nautical chart by reading the information.

FIG. 30 illustrates an example of a flow 300 which is performed in the management server 101 for storing the navigation information 231.

The navigation information storage module 218 of the management server 101 acquires the AIS information from the AIS system 104 (3010).

The navigation information storage module 218 acquires the user terminal navigation information from a plurality of user terminals 102 (3020).

The format of the AIS information and the format of the user terminal navigation information are different with each other. However, the navigation information storage module 218 is able to reformat them to the format of the navigation information 231 so as to be used in the user terminals such as the location information, the ship's name, the speed information, and the bow direction information and the like used in the map display or the radar mode display of the ship navigational system 1. The formatted information is stored in the navigation information management DB 230.

The navigation information storage module 218 continues to acquire the AIS information 233 as the navigation information 231 and the user terminal navigation information 232 always in real time.

In response to a request from the user terminal 102, the map display module 211 reads the formatted navigation information 231 from the navigation information management DB 230 and transmits it to the user terminal 102.

FIG. 31 illustrates an example of a flow 3100 which is performed in the user terminal 102 for displaying the navigation information 231.

The map display module 311 or the radar display module 312 of the user terminal 102 acquires the nautical chart information from the management server 101 or the external map server (3110). It is possible to download and store the map and nautical chart information in the auxiliary storage device in advance so as to be read appropriately.

The map display module 311 or the radar display module 312 receives the formatted navigation information 231 from the management server 101 (3120).

The icon of the corresponding ship is displayed at an appropriate position on the nautical chart which is indicated by the position information stored in the navigation information 231. In addition, the navigation information 231 includes the position information acquired from a plurality of user terminals 102 by using the respective GPS 306. Thus, it is possible to display the position information of a plurality of ships having the user terminals 102 by collectively managing the position information at the management server 101 side.

It is also possible to display the icon of the ship at the position of the AIS device-equipped ship because the AIS information 233 is also stored in the navigation information 231. In this case, it is possible to clearly indicate that the ship is the AIS device-equipped ship by using an icon which is different from the icon of the ship on which the user terminal 102 is used.

It is also possible to display only the information of the AIS device-equipped ships. On the other hand, it is also possible to display only the information of the user terminal-equipped ships.

The map display module 311 or the radar display module 312 of the user terminal 102 is configured to map and draw a ship on the nautical chart. However, it is also possible to map the ship information by the map display module 211 or the radar display module 212 of the management server 101, and transmit the mapped image information to the user terminal 102 and display it on the screen thereof.

FIG. 32 illustrates an example of a process flow 3200 of displaying the caution/warning alert for a collision of FIG. 18.

The collision judgement module 217 of the management server 101 calculates the predicted moving route 1812 of the other ship and the predicted moving route of the own ship, and determines whether they cross with each other or not (3210). The predicted moving route is, for example, a route to a predicted arriving position after 5 minutes.

In the case of crossing, the collision judgement module 217 calculates the time to the event of crossing (3220). If the time to crossing is determined less than 3 minutes, the radar display module 312 is instructed to display a notification of warning, such as warning display 1850. The radar display module 312 displays the notification of warning 1851. The other ship 1861 is displayed by changing the color to red. In addition, the warning 1864 is displayed by using an animation of red colored concentric circles around the other ship 1861. The velocity vector 1873 of the own ship is also displayed by changing the color to red.

Furthermore, the radar display module 312 displays the time 1871 to the event of the crossing between the predicted moving route 1862 of the other ship 1861 and the moving direction 1813 of the own ship, and displays the predicted arriving position 1872 of the own ship at the time on the speed vector 1873 (3240).

In a case that the time to the crossing exceeds three minutes, the radar display module 312 is instructed to display the notification of caution, such as the caution display 1800. The radar display module 312 displays the notification of caution 1801. The other ship 1811 is displayed by changing the color to yellow. Also, the velocity vector 1823 of the own ship is displayed by changing the color to yellow.

The radar display module 312 calculates the time 1821 until the predicted moving route 1812 of the other ship and the moving direction 1813 of the own ship cross with each other, and displays the predicted arriving position 1822 of the own ship at the time on the speed vector 1823.

Until an instruction for terminating the display is received, the radar display module 312 and the collision judgement module 217 continue to execute the flow of processing the caution/warning alert (3260). Once it is determined that the other ship and the own ship are separated and the predicted moving distance of the other ship and the predicted moving distance of the own ship do not cross with each other again, the displaying of the notification of caution/warning is reset and the flow is repeated (3270).

FIG. 33 illustrates an example of another flow 3300 of processing of the caution/warning for a collision of FIGS. 19-22.

The collision judgement module 217 of the management server 101 determines whether the caution or warning area of the own ship overlaps the caution or warning area of other ships (3310) or not.

In a case that both of them overlap with each other, it is determined whether the warning area of the own ship overlaps the warning area of the other ship or not (3320). If both of them overlap with each other, the notification of warning is displayed (3330).

In a case that both of them do not overlap with each other, it is determined whether the caution area of the own ship overlaps the caution area of the other ship or not (3340). If both of them overlap with each other, the notification of caution is displayed (3350).

In a case that both of them do no overlap with each other, it means that the caution area of the own ship overlaps with the warning area of the other ship, or the warning area of the own ship overlaps with the caution area of the other ship. In this case, the notification of caution is displayed (3360).

According to the above-mentioned flow, there are two types of notifications such as the notification of warning and the notification of caution. In this case, the level of importance or urgency of the notification of warning is higher than that of the notification of caution. Since the notifications are set in two levels, the notification of caution is displayed when the area of caution and the area of warning overlap with each other as in the step 3360, but the notification of warning may be displayed in such a case in consideration of safety.

It is possible to set the levels of the notification in the three levels instead of the two levels. For example, in a case that the area of caution and the area of warning overlap with each other as in the step 3360, a notification of the middle level of the three levels such as "serious caution" may be displayed.

Although the collision determination is performed by the collision judgement module 217, in the actual display of the caution/warning, the notification of caution/warning is displayed by the user terminal 102 by giving an instruction to display to the map display module 311 or the radar display module 312 of the user terminal 102.

Until an instruction for terminating the display is received, the collision judgement module 217 and the display module continue to execute the flow of processing the caution/warning (3370). Once it is determined that the other ship and the own ship are separated and the caution/warning area of the other ship and that of the own ship do not overlap again, the displaying of the notification of caution/warning is reset and the flow is repeated (3380).

2nd Embodiment

According to the 2nd embodiment, details of a virtual radio system which is used in the ship navigational system 1 will be described.

FIG. 34 illustrates an example of a virtual radio function display screen 3400.

The virtual radio is configured by using a data communication of the mobile telephone network instead of the VHF radio, so as to communicate with an interface similar to the VHF radio device virtually. The virtual radio implements the function of the virtual VHF radio and the function of the group radio.

A radio button 3401 indicates a receiving of the virtual radio. When the virtual VHF radio is received, the light is turned on in orange color. And when this button is tapped, it is changed to the virtual VHF radio function mode. An orange colored transmission icon 3402 in the same series as the button is displayed on the ship which transmits the virtual VHF radio.

When the group radio is received, the wireless button 3401 is turned on in green color. And when this button is tapped, it is changed to the group radio function mode. A green colored transmission icon 3402 in the same series as the button is displayed on the ship which transmits the group radio.

FIG. 35 illustrates examples of virtual radio control panels 3500, 3550.

In the virtual VHF radio control panel 3500, the virtual VHF radio function and the group radio function are able to be switched by using the segment controls 3501 and 3511.

When a channel is selected, the channel number 3502 is changed in real time. The channel 16 is corresponding to the paging frequency. This channel is used to call the other station. Then, it is moved to the channel according to the type.

In an actual VHF radio, a different frequency is assigned to each channel, and the communication is performed by switching the frequency. On the other hand, in the case of the virtual VHF radio, the communication is performed by using the IP protocol or the like in the data communication of the mobile telephone network. For example, the channel number is assigned to each communication simulatively so that only the data to which the same channel number is assigned is able to be transmitted and received each other.

The receiving status display buttons 3503 and 3513 are displayed in green color in a blinking manner upon receiving data by radio. Also, the buttons 3503 and 3513 are displayed in red color in a blinking manner upon transmitting data.

The Hi/Low indications 3504 and 3514 are configured to label the status of Hi/Low of pseudo-radio intensity.

By tapping the PTT (Push to talk) buttons 3505 and 3515, it becomes possible to speech. The buttons are displayed in red color during the transmission of data to make the transmission state easier to be understood.

In the group radio control panel 3550, the radio communication which is communicatable only between the set groups is realized by using the data communication of the mobile telephone network simulatively.

In the group name 3512, the name of the organization which uses the group radio is displayed. Only the group channel assigned to the group is allowed to be used. Since the communication is restricted in advance, the channel selection is not allowed (also, the button is not displayed).

In FIG. 36, examples of virtual radio function display screens 3600 performed in the land-based management terminal 103 or the like are illustrated.

In the green colored group radio transmitting and receiving area 3601, the current group setting status of the group radio is displayed. Also, the name of group radio which is fixed and currently in use is displayed.

In the orange colored virtual VHF transmitting and receiving area 3602, the channel information which is currently in use by the virtual VHF radio is displayed. Also, the channel numbers from 1 to 88 are displayed.

The transmitting and receiving indicator lamp 3603 indicates a transmitting status and a receiving status. Upon receiving data, it is displayed in green color in a blinking manner. Also, it is displayed in red color in a blinking manner upon transmitting data. The radio is able to be transmitted while the channel is selected and the PTT (Push to talk) button 3604 is pressed. During data transmission, the microphone icon 3604 is blinked in red color.

A green colored balloon 3605 is displayed for a ship which is transmitting the group radio (in talking mode), and an orange colored balloon 3606 is displayed for a ship which is transmitting the virtual VHF (in talking mode).

By clicking a range button 3652, the icon is changed to blue color, and a radio transmitting and receiving area 3651 is displayed on the map, and then the use of the Hi-Lo buttons 3653, 3654 becomes enabled. By clicking the button again, the transmitting and receiving area is hidden and the use of the Hi/Lo button becomes disabled.

In the case of the VHF radio, there is a limit in the reach of the VHF radio waves so that the area where the radio wave can reach becomes the area where the radio communications is allowed eventually. By increasing or decreasing the wave strength (set to Hi or Lo), the area where the radio wave can reach is increased or decreased so that the area where radio communications can be performed is increased or decreased.

On the other hand, in the virtual radio function, the data communication by using the mobile telephone network reproduces the VHF radio interface simulatively. Since it is actually the communication using IP, it is possible to communicate anywhere as long as it is connected to the network. Therefore, in the case of the virtual radio function, the area in which the communication can be performed is limited to within an area of, for example, a radius of 30 km from the center position of the corporation 3611 which lends the radio.

By clicking the Hi button 3653, the radio module 216 expands the transmitting and receiving area 3651 to within an area of, for example, a radius of 50 km. Also, by clicking the Lo button 3654, the area is reduced to, for example, within an area of radius 10 km.

Thus, it is possible to expand and reduce the transmitting and receiving area simulatively so that an interface like a VHF radio is created. Therefore, the conventional users of the VHS radio are able to use the interface without feeling uncomfortable.

In FIG. 37, an example of a flow 3700 of processing the virtual radio is illustrated.

The radio module 216 of the management server 101 acquires the position information of the company 3611, which rented the radio, from the radio management information 223 (3710), and acquires the position information of the user terminal 102 which is included in the user terminal navigation information 232 (3720).

The radio module 216 determines whether the Hi button 3653 has been pressed or not (3730) and, if pressed, it provides a radio function to the user terminal 102 which is located within an area of, for example, a radius of 50 km from the company 3611 (3740).

The radio module 216 determines whether the Lo button 3654 has been pressed or not (3750) and, if pressed, it provides a radio function to the user terminal 102 which is located within an area of, for example, a radius of 10 km from the company 3611 (3760).

When none of the buttons is pressed, it provides the radio function to the user terminal 102 which is located within a normal area of, for example, a radius of 30 km from the company 3611 (3770).

The radio module 216 continues to acquire the position information of the user terminal 102 and repeats the flow until it receives an instruction to terminate the radio function or to terminate the map display or the radar mode display (3780).

The present invention is not limited to the above-described embodiments, and various modifications can be included. For example, the above-described examples have been explained in detail for the purpose of illustrating the present invention easily. The present invention is not necessarily limited to these examples which include all of the described configurations. It is also possible to replace a part of the configuration of one embodiment with the configuration of another embodiment. It is also possible to add the configuration of one embodiment to the configuration of another embodiment. Furthermore, it is possible to add, delete, or replace a part of the configuration of each embodiment.

In addition, some or all of the above-described configurations, functions, processing units, processing means, and the like may be realized by hardware, for example, by using an integrated circuit. In addition, the above-described configurations, functions, and the like may be implemented by software with which a program is interpreted and executed by the processor so as to realize the respective functions. Information such as programs, tables, and files that realize various functions can be stored in a memory, a recording device such as a hard disk or an SSD (Solid State Drive), or a recording medium such as an IC card, an SD card, or a DVD.

In addition, the control lines and the information lines are indicated so as to be necessary for the purpose of the explanation, and all of the control lines and the information lines are not always indicated in terms of products. Actually, it may be considered that almost all the configurations are connected to each other.

DESCRIPTION OF SYMBOLS

101 . . . Management server, 102 . . . user terminal, 103 . . . land-based management terminal, 221 . . . user management information, 222 . . . ship management information, 700 . . . map display screen, 900 . . . navigation record screen, 1000 . . . route plan setting screen, 1100 . . . plot information display screen, 1300 . . . fishery plot information display screen, 1600 . . . weather information display screen, 1700 . . . radar mode display screen

The invention claimed is:

1. A method for navigating a ship, comprising:
    receiving a first position information and a second position information from a management server having a storage module for storing the first position information of a first ship and the second position information of a second ship wherein the first position information is received via a mobile telephone network from a user terminal used in the first ship and the second position information is transmitted via VHF radio from an AIS (Automatic Identification System) device used in the second ship and received via an AIS system;
    displaying an icon indicating the first ship at a position indicated by the first position information on a nautical chart, and an icon indicating the second ship at a position indicated by the second position information on the nautical chart;
    displaying a track of the position indicated by the first position information of the first ship and a track of the position indicated by the second position information of the second ship for a predetermined period from past to present;
    setting a warning area as a fan-shaped area having a first center angle and a radius corresponding to a first distance in the moving direction of the ship and setting a caution area as a fan-shape area having a second center angle larger that the first center angle and a radius corresponding to a second distance in the moving direction shorter than the first distance; and
    displaying a notification of caution or a notification of warning in a case where the caution area or the warning area of the first ship overlaps the caution area or the warning area of other ship.

2. The method for navigating the ship of claim 1, comprising:
    displaying a predicted moving route of the first ship in future which is calculated based on a track of the position indicated by the first position information for a predetermined second time period in past.

3. The method for navigating the ship of claim 1, comprising:
    displaying a predicted moving route of the second ship in future which is calculated based on a speed information of the second ship received from the AIS system.

4. The method for navigating the ship of claim 3, wherein a notification of warning is displayed in a case where the predicted moving route of the first ship and the predicted moving route of the second ship cross with each other within a predetermined time.

5. The method for navigating the ship of claim 4, comprising:
calculating and displaying a time until the predicted moving route of the first ship and the predicted moving route of the second ship cross with each other.

6. The method for navigating the ship of claim 5, comprising:
displaying a predicted arriving position of the first ship on the predicted moving route of the first ship up to the time of crossing.

7. The method for navigating the ship of claim 1, wherein one or more of concentric circles centered on the icon indicating the first ship is displayed on the nautical chart, and the position of the icon indicating the first ship is fixedly displayed in a screen by moving the nautical chart in a direction opposite to the moving direction of the first ship in a case where the first ship moves.

8. The method for navigating the ship of claim 1, comprising:
displaying the notification of caution in a case where one caution area and other caution area overlap; and
displaying the notification of warning in a case where one warning area and other warning area overlaps.

9. The method for navigating the ship of claim 1, wherein the notification of caution is displayed in a case where the caution area and the warning area overlap.

10. A management server for use in a ship navigation system, comprising:
a storage module for storing a first position information of a first ship received via a mobile telephone network from a user terminal used in the first ship, and a second position information of a second ship transmitted via a VHF radio from an AIS device used in the second ship and received via an AIS system,
a transmitting module for transmitting the first position information and the second position information to a second user terminal for displaying an icon indicating the first ship at a position indicated by the first position information on a nautical chart displayed on the second user terminal,
wherein an icon indicating the second ship at a position indicated by the second position information on the nautical chart is displayed,
wherein a track of the position indicated by the first position information of the first ship and a track of the position indicated by the second position information of the second ship for a predetermined period from past to present is displayed,
wherein a warning area as a fan-shaped area having a first center angle and a radius corresponding to a first distance in the moving direction of the ship and a caution area as a fan-shape area having a second center angle larger that the first center angle and a radius corresponding to a second distance in the moving direction shorter than the first distance is set, and
wherein a notification of caution or a notification of warning is displayed in a case where the caution area or the warning area of the first ship overlaps the caution area or the warning area of other ship.

11. The management server of claim 10, wherein the transmitting module transmits an information for displaying a predicted moving route of the first ship in future based on the track of the position indicated by the first position information in past predetermined second period to the second user terminal.

12. The management server of claim 10, wherein the transmitting module transmits a speed information of the second ship received from the AIS system for displaying the predicted moving route of the second ship in future to the second user terminal.

13. The management server of claim 12, comprising a collision judgement module for displaying a notification of warning to a user terminal in the first ship in a case where the predicted moving route of the first ship and the predicted moving route of the second ship cross with each other within a predetermined time period.

14. The management server of claim 13, wherein the collision judgement module calculates and displays a time until the predicted moving route of the first ship and the predicted moving route of the second ship cross with each other.

15. The management server of claim 14, wherein the collision judgement module displays the predicted arriving position of the first ship on the predicted moving route of the first ship up to a time of crossing.

16. The management server of claim 10, wherein one or more of concentric circles centered on the icon indicating the first ship is displayed on the nautical chart of the second user terminal, and the position of the icon indicating the first ship is fixedly displayed in a screen by moving the nautical chart in a direction opposite to the moving direction of the first ship in a case where the first ship moves.

17. The management server of claim 10, wherein a collision judgement module displays the notification of the caution in a case where one caution area and other caution area overlap, and displays the notification of the warning in a case where one warning area and other warning area overlap.

18. The management server of claim 10, wherein a collision judgement module displays the notification of the warning notification in a case where the caution area and the warning area overlaps.

* * * * *